US012696201B2

(12) United States Patent　　　(10) Patent No.:　US 12,696,201 B2
Wakudkar et al.　　　　　　　　　(45) Date of Patent:　　Jul. 28, 2026

(54) TRIGGER-BASED SYSTEM TO POLL ENERGY REQUIREMENTS OF AMBIENT POWER DEVICES AND A METHOD THEREOF

(71) Applicant: Cisco Technology, Inc., San Jose, CA (US)

(72) Inventors: Sachin D. Wakudkar, Ecublens (CH); Robert Barton, Vancouver (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 310 days.

(21) Appl. No.: 18/616,012

(22) Filed: Mar. 25, 2024

(65) Prior Publication Data

US 2025/0220593 A1　　Jul. 3, 2025

Related U.S. Application Data

(60) Provisional application No. 63/615,218, filed on Dec. 27, 2023.

(51) Int. Cl.
　　*H04W 52/36*　　　(2009.01)
　　*H04W 52/24*　　　(2009.01)
(52) U.S. Cl.
　　CPC ....... *H04W 52/365* (2013.01); *H04W 52/242* (2013.01)
(58) Field of Classification Search
　　CPC ........................... H04W 52/365; H04W 52/242
(Continued)

(56) References Cited

U.S. PATENT DOCUMENTS 10,075,917　B2 *　9/2018　Lee ...................... H04W 24/00
2008/0084848　A1 *　4/2008　Jard .................... H04W 52/143
　　　　　　　　　　　　　　　　　　　　　　370/332
(Continued)

FOREIGN PATENT DOCUMENTS

WO　　2017215167　A1　12/2017
WO　　2022252859　A1　12/2022

OTHER PUBLICATIONS

International Search Report and Written Opinion for International Application No. PCT/US2024/058018, mailed Mar. 14, 2025, 19 Pages.

*Primary Examiner* — Don N Vo
(74) *Attorney, Agent, or Firm* — Rutan & Tucker, LLP; Ravi Mohan; Marc McClain

(57)　　　　　ABSTRACT

Devices, networks, systems, methods, and processes for polling a plurality of ambient power devices and generating one or more charging schedule for the plurality of ambient power devices are described herein. An Access Point (AP) can transmit an energy poll trigger frame to one or more ambient power devices. The one or more ambient power devices can transmit one or more energy poll frames in response to the energy poll trigger frame. The one or more energy poll frames can be indicative of one or more energy parameters associated with the one or more ambient power devices. The AP can generate one or more charging schedules for the one or more ambient power devices based on the one or more energy parameters. The AP may generate and transmit one or more charging frames based on the one or more charging schedules to charge the one or more ambient power devices.

20 Claims, 10 Drawing Sheets

(58) Field of Classification Search
USPC ......................................................... 455/522
See application file for complete search history.

(56) References Cited

U.S. PATENT DOCUMENTS

| | | | |
|---|---|---|---|
| 2014/0217967 A1* | 8/2014 | Zeine | H02J 50/20 |
| | | | 320/108 |
| 2015/0091706 A1 | 4/2015 | Chemishkian | |
| 2016/0119881 A1* | 4/2016 | Merlin | H04W 52/54 |
| | | | 370/328 |
| 2017/0150455 A1* | 5/2017 | Li | H04W 52/36 |
| 2018/0234924 A1* | 8/2018 | Rong | H04W 52/242 |
| 2020/0220391 A1 | 7/2020 | Zeine et al. | |
| 2020/0296780 A1 | 9/2020 | Zeine et al. | |
| 2023/0141111 A1 | 5/2023 | Ciochina et al. | |
| 2023/0369899 A1 | 11/2023 | Johnston et al. | |
| 2023/0378807 A1 | 11/2023 | Wang et al. | |

* cited by examiner

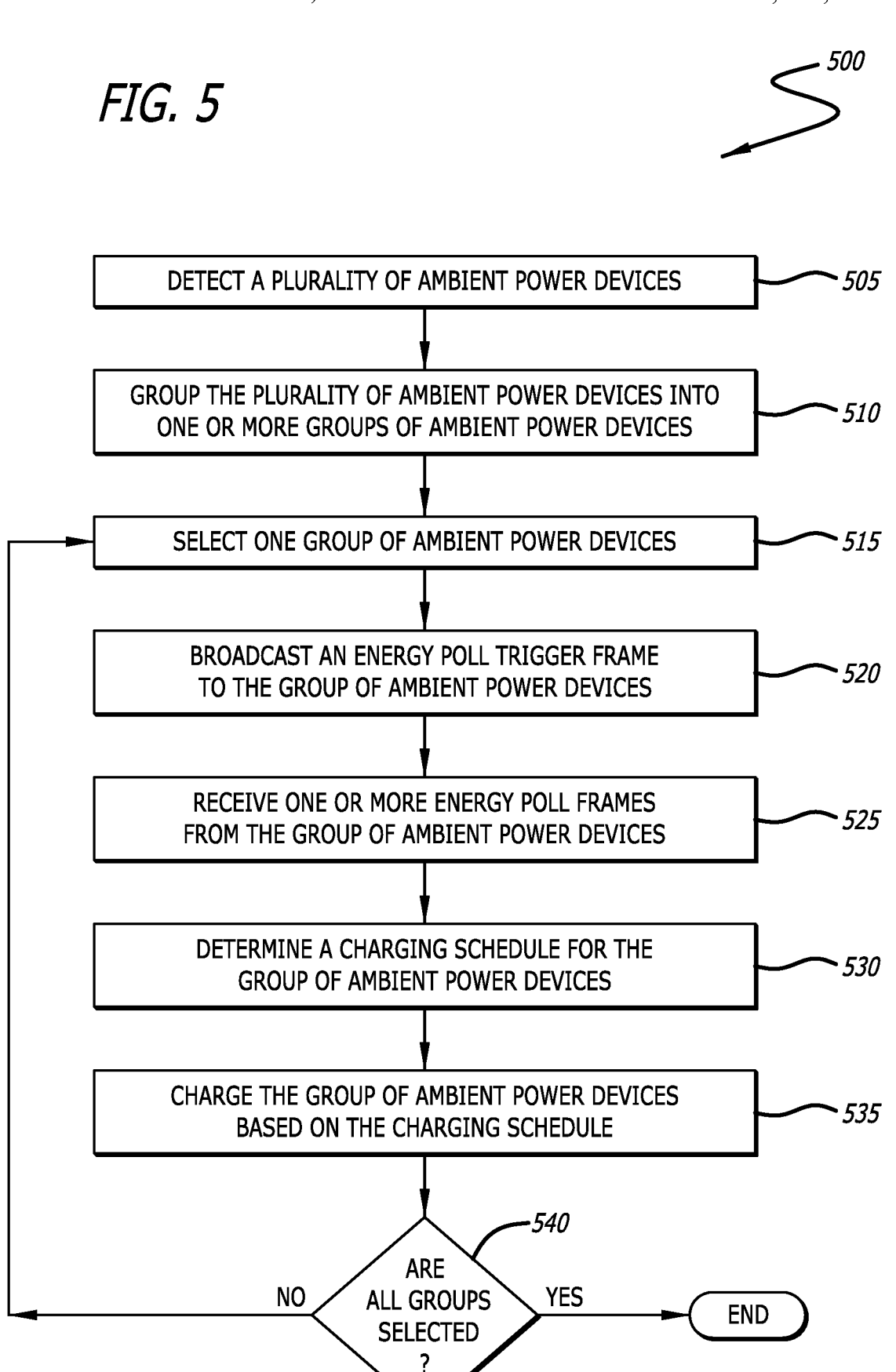

DETECT A PLURALITY OF AMBIENT POWER DEVICES — 505

GROUP THE PLURALITY OF AMBIENT POWER DEVICES INTO ONE OR MORE GROUPS OF AMBIENT POWER DEVICES — 510

SELECT ONE GROUP OF AMBIENT POWER DEVICES — 515

BROADCAST AN ENERGY POLL TRIGGER FRAME TO THE GROUP OF AMBIENT POWER DEVICES — 520

RECEIVE ONE OR MORE ENERGY POLL FRAMES FROM THE GROUP OF AMBIENT POWER DEVICES — 525

DETERMINE A CHARGING SCHEDULE FOR THE GROUP OF AMBIENT POWER DEVICES — 530

CHARGE THE GROUP OF AMBIENT POWER DEVICES BASED ON THE CHARGING SCHEDULE — 535

540

ARE ALL GROUPS SELECTED ?

NO

YES

END

*FIG. 6*

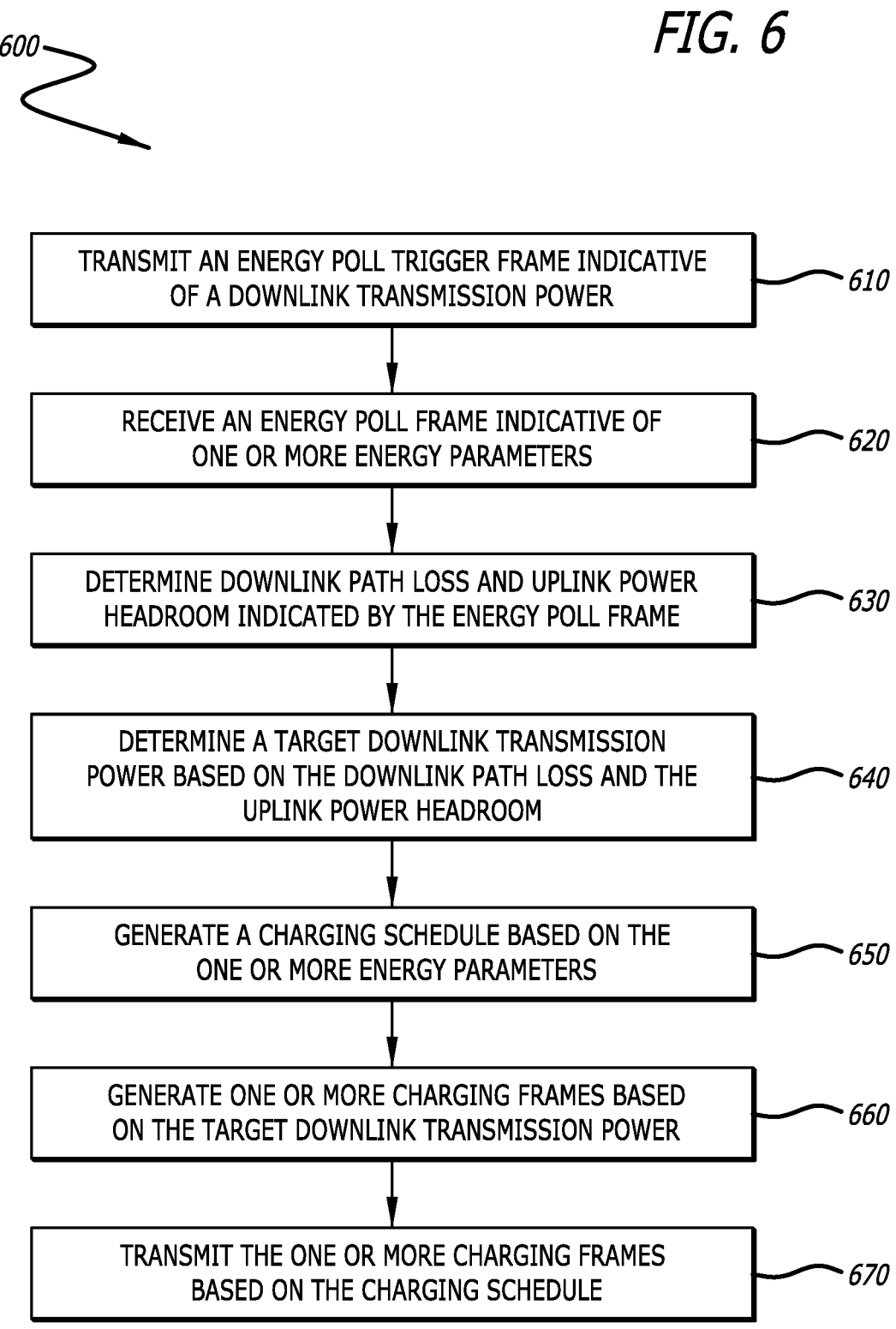

600

TRANSMIT AN ENERGY POLL TRIGGER FRAME INDICATIVE
OF A DOWNLINK TRANSMISSION POWER — 610

RECEIVE AN ENERGY POLL FRAME INDICATIVE OF
ONE OR MORE ENERGY PARAMETERS — 620

DETERMINE DOWNLINK PATH LOSS AND UPLINK POWER
HEADROOM INDICATED BY THE ENERGY POLL FRAME — 630

DETERMINE A TARGET DOWNLINK TRANSMISSION
POWER BASED ON THE DOWNLINK PATH LOSS AND THE
UPLINK POWER HEADROOM — 640

GENERATE A CHARGING SCHEDULE BASED ON THE
ONE OR MORE ENERGY PARAMETERS — 650

GENERATE ONE OR MORE CHARGING FRAMES BASED
ON THE TARGET DOWNLINK TRANSMISSION POWER — 660

TRANSMIT THE ONE OR MORE CHARGING FRAMES
BASED ON THE CHARGING SCHEDULE — 670

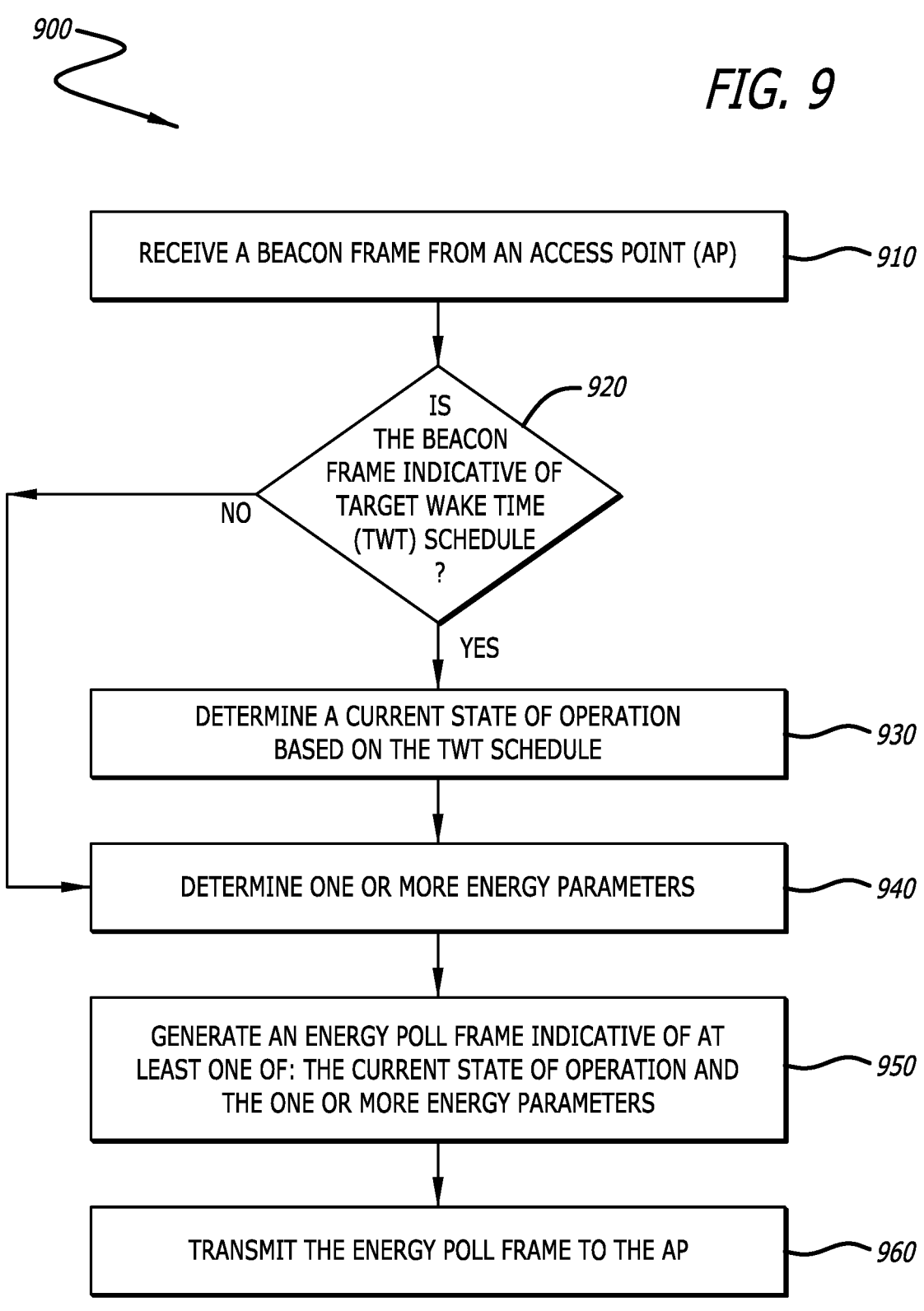

RECEIVE A BEACON FRAME FROM AN ACCESS POINT (AP) — *910*

IS THE BEACON FRAME INDICATIVE OF TARGET WAKE TIME (TWT) SCHEDULE ? — *920*

NO

YES

DETERMINE A CURRENT STATE OF OPERATION BASED ON THE TWT SCHEDULE — *930*

DETERMINE ONE OR MORE ENERGY PARAMETERS — *940*

GENERATE AN ENERGY POLL FRAME INDICATIVE OF AT LEAST ONE OF: THE CURRENT STATE OF OPERATION AND THE ONE OR MORE ENERGY PARAMETERS — *950*

TRANSMIT THE ENERGY POLL FRAME TO THE AP — *960*

TRIGGER-BASED SYSTEM TO POLL ENERGY REQUIREMENTS OF AMBIENT POWER DEVICES AND A METHOD THEREOF

CROSS-REFERENCE TO RELATED APPLICATION

This application claims the benefit of U.S. Provisional Patent Application No. 63/615,218, filed Dec. 27, 2023, which is incorporated by reference herein in its entirety.

The present disclosure relates to wireless communication. More particularly, the present disclosure relates to polling energy requirements of ambient power devices.

BACKGROUND

Ambient power devices can be of various types. The ambient power devices can be powered by one or more energy sources such as, but not limited to, radio waves, light, motion, heat, or any such ambient energy sources. Some ambient power devices may be passive devices that do not include any energy storage. Such passive devices merely reflect energy, such as Radio Frequency (RF) signals, received in real-time or in near-real time. Some other ambient power devices can be active devices that can include energy storages such as capacitors or batteries to store the energy. Such active devices can delay transmission of data by utilizing the stored energy.

The ambient power devices of different types may be equipped with different energy storage capacities, and hence, can hold different amounts of charge. This diversity in energy storage capacities poses challenges for Access Points (APs) seeking to utilize the ambient power devices efficiently. In order to efficiently charge or recharge the ambient power devices, the APs must have knowledge of the energy storage capacities of the ambient power devices. Without this knowledge, the APs may overcharge or undercharge the ambient power devices, thereby leading to inefficient energy utilization or potential malfunction of the ambient power devices.

Further, the RF signals transmitted by the AP undergo path loss. Because of the path loss, an intensity of the RF signals decreases along a transmission path from the AP to the ambient power devices. Since each ambient power device may be located at a different distance, each ambient power device may receive the RF signals with different path losses. In conventional systems, the AP has no knowledge about the path loss observed by the ambient power devices, and hence, the AP cannot efficiently charge the ambient power devices.

Therefore, there is a need for an efficient technique to determine optimum charging levels for the ambient power devices and charge the ambient power devices accordingly.

SUMMARY OF THE DISCLOSURE

Systems and methods for polling energy requirements of ambient power devices and generating charging schedules for the ambient power devices in accordance with embodiments of the disclosure are described herein. In some embodiments, a device includes a processor, a memory communicatively coupled to the processor, and a power management logic configured to detect a plurality of ambient power devices, select one or more ambient power devices of the plurality of ambient power devices, broadcast an energy poll trigger frame to the one or more ambient power devices, and receive one or more energy poll frames that is indicative of one or more energy parameters corresponding to the one or more ambient power devices in response to the energy poll trigger frame.

In some embodiments, the energy poll trigger frame is further indicative of a downlink transmission power corresponding to the energy poll trigger frame.

In some embodiments, the one or more energy poll frames are indicative of a downlink path loss corresponding to the energy poll trigger frame observed by the one or more ambient power devices.

In some embodiments, the one or more energy poll frames are further indicative of an uplink power headroom associated with the one or more ambient power devices.

In some embodiments, the power management logic is further configured to determine a target downlink transmission power based on the downlink path loss and the uplink power headroom.

In some embodiments, the power management logic is further configured to generate a charging schedule for the one or more ambient power devices based on the one or more energy parameters.

In some embodiments, the power management logic is further configured to generate one or more charging frames based on the target downlink transmission power, and transmit the one or more charging frames to the one or more ambient power devices based on the charging schedule.

In some embodiments, the charging schedule is indicative of one or more of one or more charging durations of the one or more charging frames, one or more charging intervals of the one or more charging frames, or a number of the one or more charging frames associated with the one or more ambient power devices.

In some embodiments, the one or more energy parameters include one or more of one or more maximum energy storage capacities of the one or more ambient power devices, or one or more uplink transmission powers associated with the one or more ambient power devices.

In some embodiments, the power management logic is further configured to group the plurality of ambient power devices into one or more groups of ambient power devices based on the one or more energy parameters, determine one or more time intervals for transmitting one or more beacon frames to the one or more groups of ambient power devices, and transmit the one or more beacon frames to the one or more groups of ambient power devices at the one or more time intervals.

In some embodiments, the one or more beacon frames are indicative of one or more broadcast Target Wake Time (TWT) schedules associated with the one or more groups of ambient power devices.

In some embodiments, the one or more energy poll frames are indicative of one or more current states of operation of the one or more ambient power devices based on the one or more broadcast TWT schedules.

In some embodiments, the power management logic is further configured to assign one or more radio resources to the one or more ambient power devices based on the one or more energy poll frames.

In some embodiments, a power management logic is configured to receive an energy poll trigger frame from a wireless device, determine one or more energy parameters associated with an energy storage, generate an energy poll frame indicative of the one or more energy parameters, and transmit the energy poll frame to the wireless device in response to the energy poll trigger frame.

In some embodiments, the power management logic is further configured to determine a downlink transmission power indicated by the energy poll trigger frame, measure a signal strength of the energy poll trigger frame, and determine a downlink path loss based on the downlink transmission power and the signal strength of the energy poll trigger frame.

In some embodiments, the power management logic is further configured to determine a maximum uplink transmission power, and determine an uplink power headroom based on the maximum uplink transmission power.

In some embodiments, the power management logic is further configured to receive a beacon frame from the wireless device, determine a Target Wake Time (TWT) schedule indicated by the beacon frame, and determine a current state of operation based on the TWT schedule.

In some embodiments, the energy poll frame is further indicative of at least one of the downlink path loss, the uplink power headroom, or the current state of operation.

In some embodiments, a method includes detecting a plurality of ambient power devices, selecting one or more ambient power devices of the plurality of ambient power devices, broadcasting an energy poll trigger frame to the one or more ambient power devices, and receiving one or more energy poll frames indicative of one or more energy parameters corresponding to the one or more ambient power devices in response to the energy poll trigger frame.

In some embodiments, a method further includes generating a charging schedule for the one or more ambient power devices based on the one or more energy parameters, and transmitting one or more charging frames to the one or more ambient power devices based on the charging schedule.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 5 is a flowchart depicting a process for generating a charging schedule for one or more ambient power devices, in accordance with various embodiments of the disclosure;

FIG. 6 is a flowchart depicting a process for charging one or more ambient power devices, in accordance with various embodiments of the disclosure;

FIG. 9 is a flowchart depicting a process for operating an ambient power device in a Transmit Wake Time (TWT) schedule, in accordance with various embodiments of the disclosure.

Figure 1:
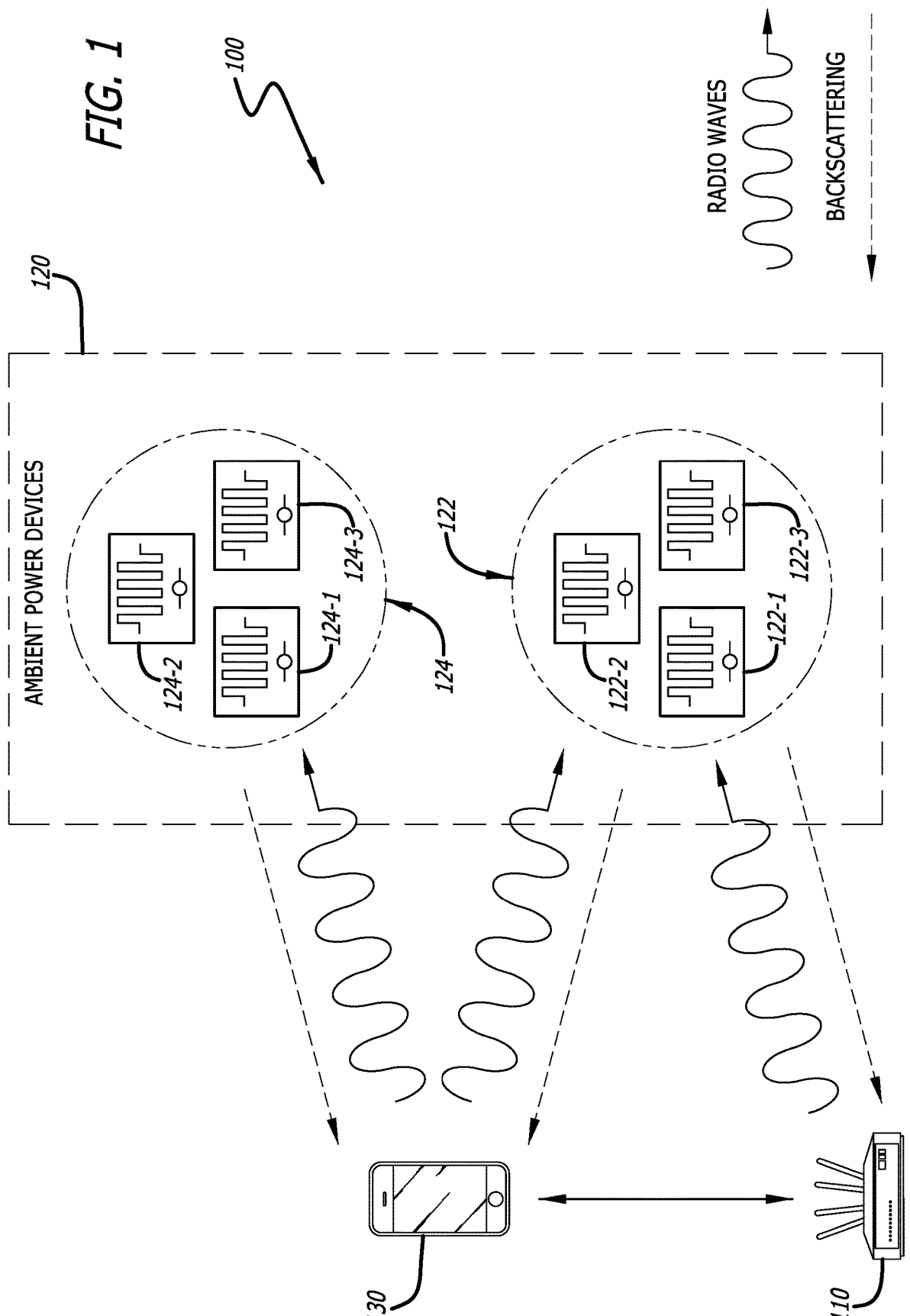
FIG. 1 is a conceptual illustration of a wireless communication network, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that poll energy requirements of ambient power devices and generate charging schedules for the ambient power devices. A communication network may comprise an Access Point (AP) and a plurality of ambient power devices. The ambient power devices can be in communication with the AP by way of one or more Radio Frequency (RF) channels. The RF channels may include multiple bands of frequencies. In some embodiments, for example, the bands of frequencies may include Wi-Fi bands such as but not limited to 2.4 GHz, 5 GHZ, or 6 GHz. Some more examples can include millimeter-wave (mmWave) bands. Additional examples can include Sub-1 GHz band frequencies. The ambient power devices can be powered by one or more ambient energy sources such as, but not limited to, radio waves, light, motion, heat, or any such ambient energy sources. Some ambient power devices may be passive devices that do not include any energy storage. Such passive devices merely reflect RF waves, received in real-time or in near-real time. Some other ambient power devices can be active devices that can include energy storages such as but not limited to capacitors or batteries to store the energy. These energy storages can be recharged by utilizing one or more of the ambient energy sources. In many embodiments, in the communication network, the ambient power devices can be in communication with the AP. The ambient power devices may be managed by the AP. In that, the AP can recharge the ambient power devices, i.e., the AP can recharge the energy storages in the ambient power devices. The AP may also schedule uplink transmissions of the ambient power devices.

In a number of embodiments, the AP may detect the ambient power devices. In some embodiments, for example, the AP can detect the ambient power devices by way of one or more network discovery protocols, probe requests and responses, beacon frames and responses, or signal strength measurements, etc. The AP can also determine whether the ambient power devices are within a Basic Service Set (BSS) corresponding to the AP. The AP may select one or more ambient power devices from the plurality of ambient power devices. In certain embodiments, the AP can select the one or more ambient power devices based on one or more of: manufacturer type, functions, serial numbers, energy requirements, signal strength measurements, distances, or locations, etc. for example. The AP may generate and store a list of ambient power devices sorted based on one or more of: serial numbers, energy requirements, signal strength measurements, or distances etc. for example. The AP can select the one or more ambient power devices and group the one or more ambient power devices. The AP may dynamically group the plurality of ambient power devices into one or more groups of ambient power devices. In more embodiments, for example, the AP can continuously monitor energy storage levels of the plurality of ambient power devices and group the plurality of ambient power devices based on the energy storage levels. In some more embodiments, for example, the AP may group the plurality of ambient power devices based on priorities of the ambient power devices.

In various embodiments, the AP can generate an energy poll trigger frame for the one or more ambient power devices or the group of ambient power devices. The energy poll trigger frame can be indicative of a downlink transmission power. The downlink transmission power may be indicative of a transmission power with which the AP transmits the energy poll trigger frame to the group of ambient power devices. In some embodiments, the energy poll trigger frame may be broadcast to the one or more ambient power devices or the group of ambient power devices. In certain embodiments, for example, the energy poll trigger frame can include a power field indicative of the downlink transmission power or an encoded downlink transmission power. In more embodiments, for example, the downlink transmission power can be in absolute terms or in relative terms with respect to a predetermined reference power value. The group of ambient power devices can receive the energy poll trigger frame. Each ambient power device of the group of ambient power devices may receive the energy poll trigger frame and determine the downlink transmission power indicated by the energy poll trigger frame. Thereafter, each ambient power device can determine a downlink path loss associated with a transmission path between the ambient power device and the AP. In that, the ambient power device may measure a signal strength of the energy poll trigger frame received from the AP. In some more embodiments, for example, the ambient power device can measure a Received Signal Strength Indicator (RSSI) value corresponding to the energy poll trigger frame. The ambient power device may compare the RSSI value with the downlink transmission power. In numerous embodiments, the downlink path loss can be determined based on a difference between the downlink transmission power and the RSSI value. In many further embodiments, the downlink path loss may be indicative of reduction in signal strength of the RF signals transmitted by the AP to the ambient power device. In still more embodiments, for example, the downlink path loss can be caused by or may vary based on one or more of following factors: distance between the AP and the ambient power device, obstructions in the transmission path, multipath interference, fading, antenna gain, frequency, change in network conditions or topology, or other environmental parameters etc.

In additional embodiments, the ambient power device can also determine an uplink power headroom. The ambient power device may determine the uplink power headroom based on a difference between a maximum uplink transmission power of the ambient power device and a current uplink transmission power of the ambient power device. The ambient power device can generate an energy poll frame. In many further embodiments, the energy poll frame can be indicative of one or more energy parameters of the ambient power device. In still more embodiments, the examples of the one or more energy parameters of the ambient power device include but are not limited to a maximum energy storage capacity of the ambient power device or an uplink transmission power of the ambient power device. The maximum energy storage capacity can be indicative of maximum charge level that the battery or the capacitor in the ambient power device may hold. The uplink transmission power can indicate an amount of charge level required for transmitting one or more uplink frames or the amount of charge consumed in transmitting the one or more uplink frames. In many additional embodiments, for example, the uplink transmission may vary dependent on communication protocols, transmission distances, and power management settings etc. associated with the ambient power device.

In further embodiments, the ambient power device can generate the energy poll frame in response to the energy poll trigger frame. In some embodiments, the energy poll frame may be indicative of one or more of: the downlink path loss observed by the ambient power device, the uplink power headroom, or the uplink transmission power. The ambient power device may transmit the energy poll frame to the AP in response to the energy poll trigger frame.

In many more embodiments, the AP may receive the energy poll frame from the ambient power device and determine a target downlink transmission power based on one or more of: the downlink path loss, the uplink power headroom, or the uplink transmission power. In some embodiments, the target downlink transmission power can be indicative of a power level or an intensity of one or more charging frames or one or more downlink frames that the AP intends the ambient power device to receive. The AP can determine the target downlink transmission power to overcome the downlink path loss. In certain embodiments, for example, the AP can utilize one or more signal measurement or modeling techniques to determine the target downlink transmission power. Since some ambient power devices may transmit one or more uplink data frames by backscattering the RF signals received from the AP, the AP may also optimize downlink power allocation to effectively utilize the uplink power headroom of the ambient power device. The AP can also determine the target downlink transmission power to avoid excessive power differentials between the uplink transmissions of the ambient power device and the downlink transmission received by the ambient power device. The AP may also determine the target downlink transmission power of the charging frames to charge the energy storage of the ambient power device. In some embodiments, the AP can determine the target downlink transmission power to fully charge the energy storage and/or to charge the energy storage up to a charge level required for the uplink transmission by the ambient power device.

In many additional embodiments, the AP can determine a charging schedule for the ambient power device. In some embodiments, for example, the charging schedule can be indicative of one or more of: a number of charging frames required to charge the ambient power device, transmission power or signal strengths of the charging frames, duration of the charging frames, intervals of the charging frames, etc. In some embodiments, for example, the AP may generate a separate charging schedule for each ambient power device or the AP can generate the charging schedule for the group of ambient power devices. In certain embodiments, for example, the charging schedule may be a fixed charging schedule indicative of predetermined durations and intervals for the charging frames. In more embodiments, for example, the charging schedule can be an adaptive charging schedule which may be adjusted based on one or more of: changes in network conditions, changes in positions of the AP and/or the ambient power devices, or network demand etc. In some more embodiments, for example, the charging schedule can be a priority-based charging schedule which can assign more charging durations to the ambient power devices that transmit high priority uplink data or that transmit real-time or near-real time uplink data. In numerous embodiments, for example, the charging schedule can be an energy-aware charging schedule which may assign more charging durations, more number of charging frames, or higher charging frequency to the ambient power devices with lower energy storage capacity or high energy consumption and assign lower charging frequency to the ambient power devices with higher energy storage capacities or lower energy consumption.

In many further embodiments, the AP may generate the charging frames based on the target downlink transmission power and transmit the charging frames to the ambient power device based on the charging schedule corresponding to the ambient power device. In some more embodiments, the charging frames can have the signal strength indicated by the target downlink transmission power. The ambient power device can receive the charging frames and charge the energy storage based on the charging frames. In some embodiments, for example, the charging frames may be indicative of harvesting energy from the one or more ambient energy sources such that the energy storage is recharged. In certain embodiments, for example, the ambient power device can charge the energy storage fully or can charge the energy storage up to the charge level required for the uplink transmission.

In still many embodiments, the AP can transmit a trigger frame to the plurality of ambient power devices. In that, the AP may transmit a separate trigger frame to each ambient power device or a single trigger frame to a group of ambient power devices. In some embodiments, for example, the AP can assign one or more radio resources, i.e., resource units to the ambient power devices. In certain embodiments, for example, the radio resources may be indicative of one or more carrier frequencies, one or more time slots, transmission order, multiplexing and/or modulating techniques, or Transmission Opportunities (TXOPs) etc. assigned to the ambient power device. The ambient power device may receive the trigger frame and transmit the uplink data by way of one or more uplink frames to the AP in response to the trigger frame. Some ambient power devices can be sensors, such as but not limited to temperature, pressure, humidity, or health sensors etc. for example. Such sensors can measure one or more physical parameters such as but not limited to temperature, pressure, or humidity values etc. for example. In that case, the uplink data can be indicative of the one or more physical parameters measured by the ambient power device.

In still further embodiments, the AP may determine a Target Beacon Transmission Time (TBTT) interval based on the energy parameters of the plurality of ambient power devices. The TBTT interval can be utilized to schedule the transmission of the beacon frames. The beacon frames can be utilized to announce presence of the AP and/or synchronize communication with the ambient power devices. In some embodiments, for example, for determining the TBTT interval, the AP can organize the plurality of ambient power devices into the groups of ambient power devices based on the energy storage capacities. For example, the ambient power devices with low energy requirements or low energy storage capacities can be grouped separately from the ambient power devices with higher energy requirements or higher energy storage capacities. Thereafter, the AP may determine TBTT interval for each group of ambient power devices. In more embodiments, for example, similar to the charging schedules, the TBTT intervals may be fixed intervals, priority-based intervals, or energy-aware intervals etc. In certain embodiments, for example, the ambient power devices with lower energy requirements may have longer TBTT intervals (for e.g., 10 beacon intervals), while the ambient power devices with higher energy requirements may have shorter intervals (for e.g., 5 beacon intervals). After determining the TBTT intervals, the AP may set the TBTT interval field or element in the beacon frame accordingly. The AP can transmit the beacon frames to the groups of ambient power devices based on the TBTT intervals. The beacon frames may also include information such as but not limited to network identifiers, capabilities, supported data rates, and timing information etc. for the ambient power devices.

In many embodiments, the AP can determine one or more Target Wake Time (TWT) schedules for the plurality of ambient power devices. In some embodiments, for example, the AP can generate a separate TWT schedule for each ambient power device or a broadcast TWT schedule for the one or more ambient power devices or the group of ambient power devices. The AP can transmit the TWT schedule to the ambient power devices through one or more management frames or one or more downlink frames, or through a TWT field or element in the beacon frame. The TWT schedules can be utilized to minimize contention of shared wireless medium between the plurality of ambient power devices in the BSS. The TWT schedules may also be utilized to coordinate wake-up times, uplink transmissions, reduce energy consumption of the ambient power devices or improve network performance etc. The ambient power devices can join the TWT schedules by synchronizing the wake-up times with wake intervals of the TWT schedule. The ambient power devices can also configure one or more operational modes or power saving modes to align with TWT service period and/or TWT service intervals. In more embodiments, for example, the ambient power devices can join the TWT during beacon intervals, i.e., TBTT intervals without requiring negotiation. The AP can change or modify the TWT schedules based on changes in the network conditions or topology, changes in network demand, etc. for example.

In a number of embodiments, the AP may generate and transmit the energy poll trigger frame to the ambient power devices based on the corresponding TWT schedules. In response to the energy poll trigger frame, the ambient power devices can generate the energy poll frames indicative of a state of operation of the ambient power devices. The energy poll frames may also be indicative of one or more of: the one or more energy parameters, the downlink path loss, the uplink power headroom, or the uplink transmission power etc. associated with corresponding ambient power devices.

The AP can determine which ambient power devices are active, i.e., in the operational mode based on the energy poll frames. The AP may thereafter transmit the trigger frame to the ambient power devices that are active or in the operational state. The trigger frame can be indicative of allocation of the radio resources to the ambient power devices. In that, the AP may allocate the radio resources to the ambient power devices based on the corresponding energy parameters of the ambient power devices. The ambient power devices can receive the trigger frame and transmit the uplink data in form of the uplink data frames to the AP. In some embodiments, the ambient power devices may use one or more time-domain or frequency-domain multiplexing techniques to transmit the uplink frames.

Advantageously, the technique for polling energy requirements of the ambient power devices and generating the charging schedules for the ambient power devices optimizes network performance, energy utilization, and communication efficiency, thereby ensuring reliable connectivity and efficient resource allocation within the network. The AP may utilize the knowledge of the energy parameters of the ambient power devices to enable efficient energy management and optimization in the network. Additionally, the AP can dynamically adjust the charging schedules based on continuous or periodic monitoring of the charge levels of the ambient power devices or based on feedback or charging requests received from the ambient power devices. The AP may also utilize Machine Learning (ML) based predictive analysis techniques to analyze historical charging data and energy consumption patterns of the ambient power devices to anticipate future energy needs of the ambient power devices and accordingly modify the charging schedules proactively. The AP can also utilize predictive models to forecast energy requirements of the ambient power devices based on types and/or priorities of the ambient power devices and adjust the charging schedules preemptively to minimize risk of energy shortages or overages, and thereby maintain uninterrupted connectivity with the ambient power devices.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a wireless communication network 100, in accordance with various embodiments of the disclosure is shown. In many embodiments, the wireless communication network 100 can include an Access Point (AP) 110. The wireless communication network 100 may also include a plurality of ambient power devices 120. The plurality of ambient power devices 120 can include a first group of ambient power devices 122 including first through third ambient power devices 122-1 to 122-3 and a second group of ambient power devices 124 including fourth through sixth ambient power devices 124-1 to 124-3. The wireless communication network 100 may also include a wireless device 130. The ambient power devices 120 may be powered by one or more energy sources such as, but not limited to, radio waves, light, motion, heat, or any such ambient energy sources. The ambient power devices 120 may be active devices, i.e., with an energy storage such as a battery or a capacitor etc. or the ambient power devices 120 can be passive devices. The ambient power devices 120 can receive one or more Radio Frequency (RF) signals. The ambient power devices 120 may backscatter the RF signals. In some embodiments, the ambient power devices 120 can modulate and backscatter incident RF signals. In certain embodiments, the ambient power devices 120 can be in communication with the AP 110 by utilizing Wi-Fi bands such as but not limited to 2.4 GHz, 5 GHZ, or 6 GHz. Some more examples can include millimeter-wave (mmWave) bands. Additional examples can include Sub-1 GHz band frequencies. Examples of the backscatter communication between the ambient power devices 120, the AP 110, and the wireless device 130 include but are not limited to monostatic backscatter, bistatic backscatter, and ambient backscatter. The wireless device 130 may function as a receiver for backscatter transmission from the ambient power devices 120. Examples of the wireless device 130 include but are not limited to smartphone, tablet, computer, an RF Identification (RFID) tag reader, etc. In certain embodiments, for example, the ambient power devices 120 may be associated with consumer electronic devices or Internet of Things (IoT) enabled devices.

In a number of embodiments, the AP 110 can generate a first energy poll trigger frame and transmit the first energy poll trigger frame to the first group of ambient power devices 122. In response to the first energy poll trigger frame, the first through third ambient power devices 122-1 to 122-3 can transmit first through third energy poll frames respectively.

The first through third energy poll frames may be indicative of one or more energy parameters corresponding to the first through third ambient power devices 122-1 to 122-3 respectively. The AP 110 may generate a second energy poll trigger frame and transmit the second energy poll trigger frame to the wireless device 130. The wireless device 130 can relay the second energy poll trigger frame to the second group of ambient power devices 124. In response to the second energy poll trigger frame, the fourth through sixth ambient power devices 124-1 to 124-3 can transmit fourth through sixth energy poll frames respectively. The fourth through sixth energy poll frames may be indicative of one or more energy parameters corresponding to the fourth through sixth ambient power devices 124-1 to 124-3 respectively. The first and second energy poll trigger frames can be indicative of first and second downlink transmission power values.

In various embodiments, the first and second groups of the ambient power devices 122 and 124 may determine corresponding downlink path losses based on the first and second downlink transmission power values and measured signal strengths of the first and second energy poll trigger frames respectively. The first through third energy poll frames may be indicative of the downlink path losses corresponding to the first through third ambient power devices 122-1 to 122-3 respectively. The fourth through sixth energy poll frames may be indicative of the downlink path losses corresponding to the fourth through sixth ambient power devices 124-1 to 124-3 respectively.

In additional embodiments, the AP 110 may receive the first through sixth energy poll frames and determine target downlink transmission powers corresponding to the first and second groups of ambient power devices 122 and 124. The AP 110 can determine a first charging schedule for the first group of ambient power devices 122 and a second charging schedule for the second group of ambient power devices 124. The AP 110 may generate a first set of charging frames based on the target downlink transmission power values corresponding to the first group of ambient power devices 122. The AP 110 can generate a second set of charging frames based on the target downlink transmission power values corresponding to the second group of ambient power devices 124. The AP 110 may transmit the first set of charging frames to the first group of ambient power devices 122 based on the first charging schedule and may transmit the second set of charging frames to the second group of ambient power devices 124 based on the second charging schedule. The first and second groups of ambient power devices 122 and 124 can receive the first and second sets of charging frames respectively. The first and second groups of ambient power devices 122 and 124 may charge the respective energy storages based on the first and second sets of charging frames.

Although a specific embodiment for the wireless communication network 100 for carrying out the various steps, processes, methods, and operations described herein is discussed with respect to FIG. 1, any of a variety of systems and/or processes may be utilized in accordance with embodiments of the disclosure. For example, the AP 110 may dynamically modify or change the first and second charging schedules of the first and second groups of ambient power devices 122 and 124. The elements depicted in FIG. 1 may also be interchangeable with other elements of FIGS. 2-10 as required to realize a particularly desired embodiment.

Figure 2:
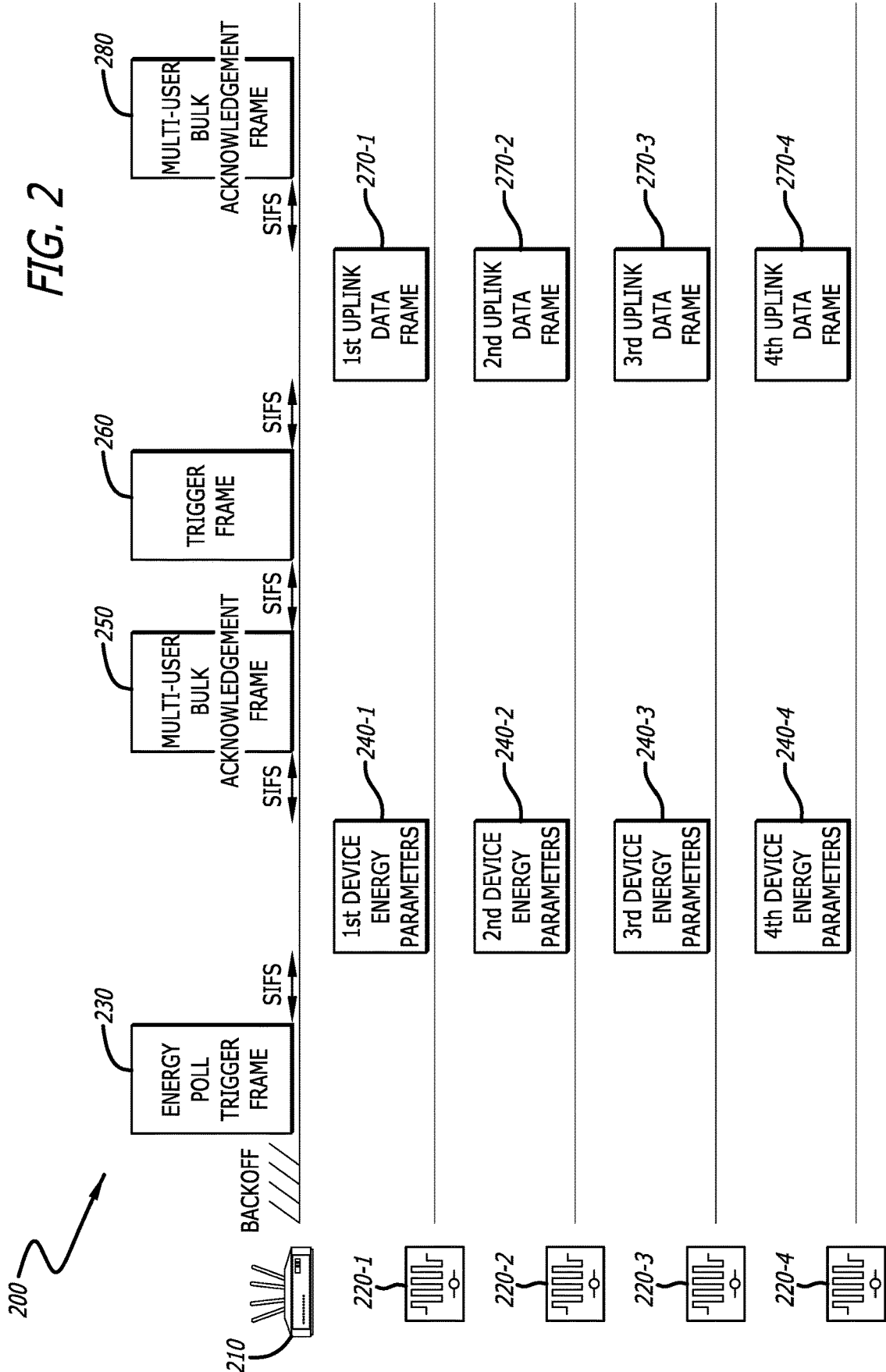
FIG. 2 is a conceptual illustration of transmission of one or more frames in a wireless communication network, in accordance with various embodiments of the disclosure.

Referring to FIG. 2, a conceptual illustration of transmission of one or more frames in a wireless communication network 200, in accordance with various embodiments of the disclosure is shown. The wireless communication network 200 can include an AP 210 and first through fourth ambient power devices 220-1 to 220-4. The AP 210 may be in communication with the first through fourth ambient power devices 220-1 to 220-4 by way of Wi-Fi.

In many embodiments, the AP 210 can generate and transmit an energy poll trigger frame 230 indicative of polling the energy parameters of the first through fourth ambient power devices 220-1 to 220-4. The AP 210 may broadcast the energy poll trigger frame 230 to the first through fourth ambient power devices 220-1 to 220-4. The first through fourth ambient power devices 220-1 to 220-4 can generate and transmit first through fourth energy poll frames 240-1 to 240-4 to the AP 210 in response to the energy poll trigger frame 230. The first through fourth energy poll frames 240-1 to 240-4 may be indicative of the energy parameters of the first through fourth ambient power devices 220-1 to 220-4. In some embodiments, the first through fourth energy poll frames 240-1 to 240-4 can be separated from the energy poll trigger frame 230 by Short Interframe Space (SIFS). The AP 210 can retrieve first through fourth set of energy parameters from the first through fourth energy poll frames 240-1 to 240-4 respectively. The AP 210 may generate the charging schedule for the first through fourth ambient power devices 220-1 to 220-4 based on the first through fourth set of energy parameters. The AP 210 can thereafter charge the first through fourth ambient power devices 220-1 to 220-4 based on the charging schedule.

In a number of embodiments, the AP 210 can transmit a multi-user bulk acknowledgement frame 250 to the first through fourth ambient power devices 220-1 to 220-4. The multi-user bulk acknowledgement frame 250 can be indicative of successfully receiving the first through fourth energy poll frames 240-1 to 240-4. The AP 210 can thereafter transmit or broadcast a trigger frame 260 to the first through fourth ambient power devices 220-1 to 220-4. The trigger frame 260 can also indicate the radio resources allocated to the first through fourth ambient power devices 220-1 to 220-4 for uplink transmission. The first through fourth ambient power devices 220-1 to 220-4 can utilize the allocated radio resources to transmit first through fourth uplink data frames 270-1 to 270-4 respectively. The first through fourth ambient power devices 220-1 to 220-4 may utilize one or more time domain or frequency domain multiplexing techniques to transmit the first through fourth uplink data frames 270-1 to 270-4 simultaneously. The first through fourth uplink data frames 270-1 to 270-4 may be indicative of the first through fourth uplink data generated by the first through fourth ambient power devices 220-1 to 220-4 respectively. The AP 210 can receive the first through fourth uplink data frames 270-1 to 270-4 and transmit a multi-user bulk acknowledgement frame 280 to the first through fourth ambient power devices 220-1 to 220-4.

Although a specific embodiment for the wireless communication network 200 for carrying out the various steps, processes, methods, and operations described herein is discussed with respect to FIG. 2, any of a variety of systems and/or processes may be utilized in accordance with embodiments of the disclosure. For example, the AP 210 may dynamically schedule the uplink transmissions from the first through fourth ambient power devices 220-1 to 220-4. The elements depicted in FIG. 2 may also be interchangeable with other elements of FIG. 1 and FIGS. 3-10 as required to realize a particularly desired embodiment.

Figure 3:
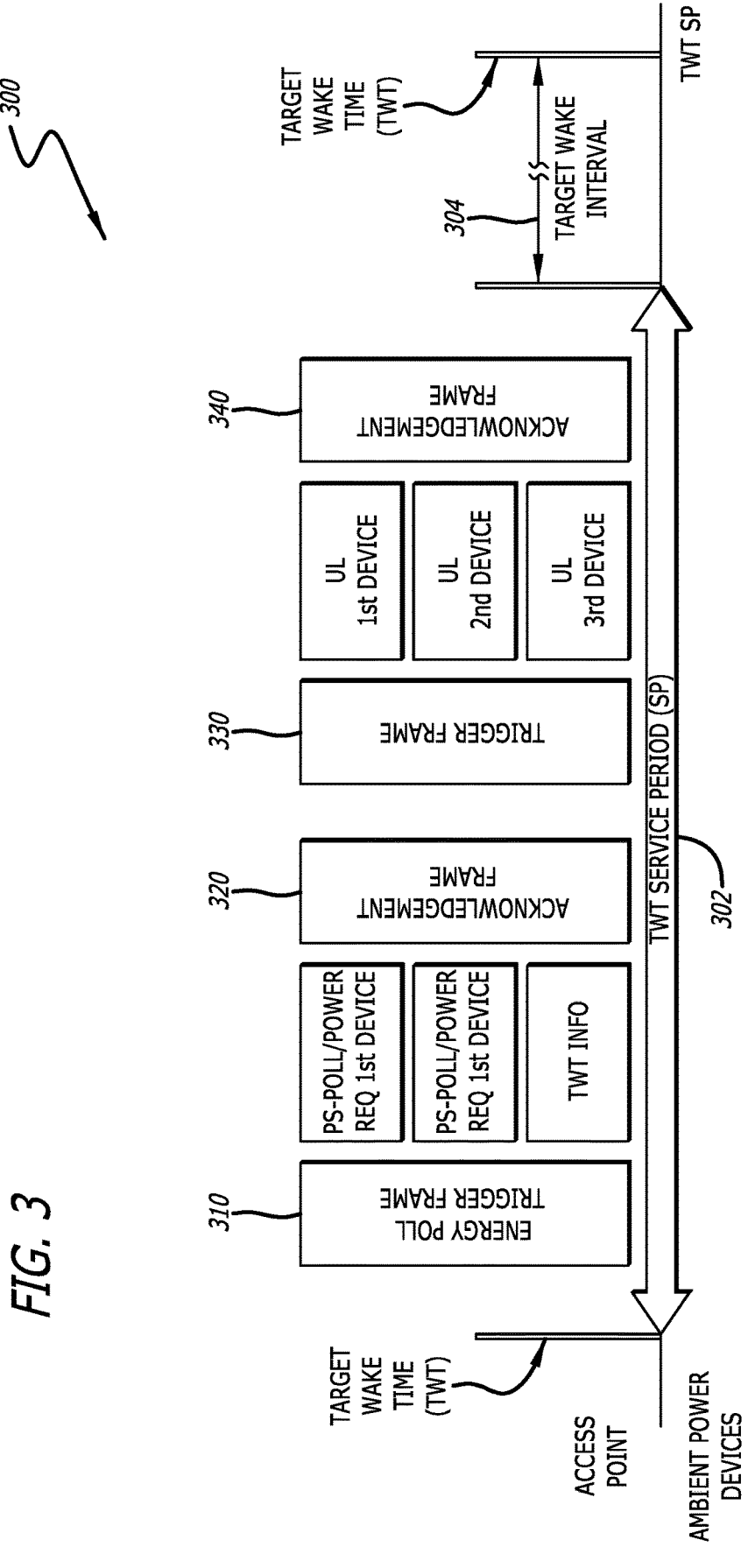
FIG. 3 is a conceptual illustration of operation of a Transmit Wake Time (TWT) schedule in a wireless communication network, in accordance with various embodiments of the disclosure.

Referring to FIG. 3, a conceptual illustration of operation of a Transmit Wake Time (TWT) schedule in a wireless communication network 300, in accordance with various embodiments of the disclosure is shown. In many embodiments, the wireless communication network 300 includes the AP and the ambient power devices. The AP may generate and transmit an energy poll trigger frame 310 to the ambient power devices. The energy poll trigger frame 310 can be indicative of the TWT schedule. The TWT schedule can be indicative of a TWT Service Period (SP) 302 and a TWT interval 304. In response to the energy poll trigger frame 310, the ambient power devices can transmit one or more energy poll frames to the AP. The energy poll frames can be indicative of the energy requirements or energy parameters of the ambient power devices. In response to the energy poll frames, the AP may transmit an acknowledgement frame 320 to the ambient power devices.

In various embodiments, upon determining the energy parameters and energy requirements of the ambient power devices, the AP may transmit a trigger frame 330 to the ambient power devices. The trigger frame 330 can be indicative of allocation of one or more radio resources, i.e., resource units such as but not limited to one or more carrier frequencies, time slots, or Transmission Opportunity (TXOP). The ambient power devices can utilize the resource units to generate and transmit one or more uplink frames to the AP. The uplink frames may be indicative of the uplink data generated by the ambient power devices. The AP can receive the uplink data and transmit an acknowledgment frame 340 to the ambient power devices.

Although a specific embodiment for the wireless communication network 300 for carrying out the various steps, processes, methods, and operations described herein is discussed with respect to FIG. 3, any of a variety of systems and/or processes may be utilized in accordance with embodiments of the disclosure. For example, the AP may dynamically modify or change the TWT schedule to adapt to changes in the network conditions of the wireless communication network 300. The elements depicted in FIG. 3 may also be interchangeable with other elements of FIGS. 1-2 and FIGS. 4-10 as required to realize a particularly desired embodiment.

Figure 4:
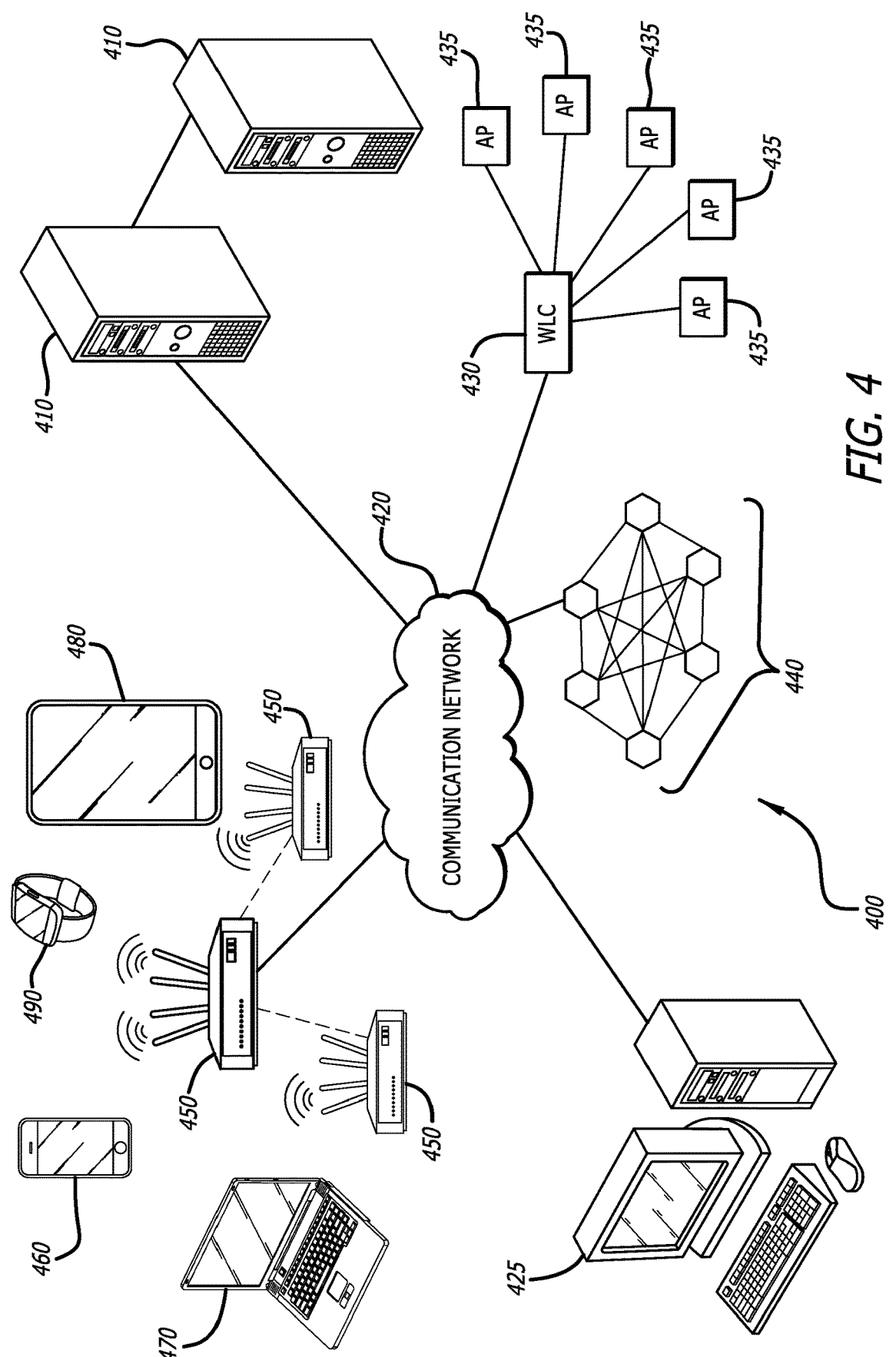
FIG. 4 is a conceptual network diagram of various environments that a power manager may operate on a plurality of network devices, in accordance with various embodiments of the disclosure.

Referring to FIG. 4, a conceptual network diagram 400 of various environments that a power manager may operate on a plurality of network devices, in accordance with various embodiments of the disclosure is shown. Those skilled in the art will recognize that the power manager can be comprised of various hardware and/or software deployments and can be configured in a variety of ways. In many embodiments, the power manager can be configured as a standalone device, exist as a logic in another network device, be distributed among various network devices operating in tandem, or remotely operated as part of a cloud-based network management tool. In further embodiments, one or more servers 410 can be configured with or otherwise operate the power manager. In many embodiments, the power manager may operate on one or more servers 410 connected to a communication network 420. The communication network 420 can include wired networks or wireless networks. In many embodiments, the communication network 420 may be a Wi-Fi network operating on various frequency bands, such as, 2.4 GHZ, 5 GHz, or 6 GHz. In further embodiments, the power manager operating on the servers 410 can facilitate in polling the energy parameters of the ambient power devices and generating the charging schedule for the ambient power devices. The power manager can be provided as a cloud-based service that can service remote networks, such as, but not limited to a deployed network 440. In many embodiments, the power manager can be a logic that recharges the energy storages of the ambient power devices.

However, in additional embodiments, the power manager may be operated as a distributed logic across multiple network devices. In the embodiment depicted in FIG. 4, a plurality of APs 450 can operate as the power manager in a distributed manner or may have one specific device operate as the power manager for all of the neighboring or sibling APs 450. The APs 450 facilitate Wi-Fi connections for various electronic devices, such as but not limited to mobile computing devices including laptop computers 470, cellular phones 460, portable tablet computers 480 and wearable computing devices 490.

In further embodiments, the power manager may be integrated within another network device. In the embodiment depicted in FIG. 4, a wireless LAN controller (WLC) 430 may have an integrated power manager that the WLC 430 can use to poll the energy parameters of the ambient power devices associated with the various APs 435 that the WLC 430 is connected to, either wired or wirelessly. In still more embodiments, a personal computer 425 may be utilized to access and/or manage various aspects of the power manager, either remotely or within the network itself. In the embodiment depicted in FIG. 4, the personal computer 425 communicates over the communication network 420 and can access the power manager of the servers 410, or the network APs 450, or the WLC 430.

Although a specific embodiment for various environments that the power manager may operate on a plurality of network devices suitable for carrying out the various steps, processes, methods, and operations described herein is discussed with respect to FIG. 4, any of a variety of systems and/or processes may be utilized in accordance with embodiments of the disclosure. In many non-limiting examples, the power manager may be provided as a device or software separate from the network devices or the power manager may be integrated into the network devices. The elements depicted in FIG. 4 may also be interchangeable with other elements of FIGS. 1-3 and 5-10 as required to realize a particularly desired embodiment.

Referring now to FIG. 5, a flowchart depicting a process 500 for generating the charging schedule for the ambient power devices, in accordance with various embodiments of the disclosure is shown. In many embodiments, the process 500 can detect the plurality of ambient power devices (block 505). In some embodiments, the process 500 may be implemented by the AP. In certain embodiments, for example, the process 500 can detect the ambient power devices by way of one or more network discovery protocols, probe requests and responses, beacon frames and responses, or signal strength measurements, etc. In more embodiments, the process 500 may also determine whether the ambient power devices are within a Basic Service Set (BSS) corresponding to the AP that implements the process 500.

In a number of embodiments, the process 500 can group the plurality of ambient power devices into the one or more groups of ambient power devices (block 510). In some embodiments, the process 500 may select the one or more ambient power devices from the plurality of ambient power devices. In certain embodiments, for example, the process 500 can select the one or more ambient power devices based on one or more of: manufacturer type, functions, serial numbers, energy requirements, signal strength measurements, distances, or locations, etc. In more embodiments, the process 500 may generate and store a list of ambient power devices sorted based on one or more of: serial numbers, energy requirements, signal strength measurements, or distances etc. for example. In more embodiments, the process 500 can select the one or more ambient power devices and group the one or more ambient power devices. In some more embodiments, the process 500 may dynamically group the plurality of ambient power devices into one or more groups. In numerous embodiments, for example, the process 500 can continuously monitor energy storage levels of the ambient power devices and group the ambient power devices based on the energy storage levels. In many more embodiments, for example, the process 500 may group the ambient power devices based on priorities of the ambient power devices.

In additional embodiments, the process 500 may select one group of ambient power devices (block 515). In some embodiments, the process 500 can sequentially select each group of ambient power devices of the one or more groups of ambient power devices such that all groups of ambient power devices receive the energy poll trigger frame. In certain embodiments, the process 500 may select the one or more groups of ambient power devices based on one or more parameters, such as but not limited to distance of the group, energy parameters of the ambient power devices in the group, priorities of the ambient power devices in the group, etc. for example.

In further embodiments, the process 500 can broadcast the energy poll trigger frame to the group of ambient power devices (block 520). In some embodiments, the energy poll trigger frame can be indicative of the downlink transmission power. In certain embodiments, the downlink transmission power may be indicative of the transmission power with which the process 500 transmits the energy poll trigger frame to the group of ambient power devices. In more embodiments, for example, the energy poll trigger frame can include a power field indicative of the downlink transmission power or encoded downlink transmission power. In some more embodiments, for example, the downlink transmission power can be in absolute terms or in relative terms with respect to a predetermined reference power value.

In many more embodiments, the process 500 may receive the energy poll frames from the group of ambient power devices (block 525). In some embodiments, the energy poll frames can be indicative of one or more energy parameters of the ambient power devices. In certain embodiments, the energy poll frames may be indicative of one or more of: the downlink path loss, the uplink power headroom, or the uplink transmission power associated with the ambient power devices. In more embodiments, the process 500 can associate each energy poll frame with corresponding ambient power device in the group.

In many additional embodiments, the process 500 can determine the charging schedule for the group of ambient power devices (block 530). In some embodiments, for example, the charging schedule can be indicative of one or more of: a number of charging frames required to charge the ambient power device, transmission power or signal strengths of the charging frames, duration of the charging frames, intervals of the charging frames, etc. In certain embodiments, for example, the process 500 may generate a separate charging schedule for each ambient power device or the process 500 can generate the charging schedule for the group of ambient power devices. In certain embodiments, for example, the charging schedule may be a fixed charging schedule indicative of predetermined durations and intervals for the charging frames. In more embodiments, for example, the charging schedule can be an adaptive charging schedule which may be adjusted based on one or more of: change in network conditions, changes in positions of the AP and/or the ambient power devices, or network demand etc. In some more embodiments, for example, the charging schedule can be a priority-based charging schedule which can assign more charging durations to the ambient power devices that transmit high priority uplink data or that transmit real-time or near-real time uplink data. In numerous embodiments, for example, the charging schedule can be an energy-aware charging schedule which may assign more charging durations, more number of charging frames, or higher charging frequency to the ambient power devices with lower energy storage capacity or high energy consumption and assign lower charging frequency to the ambient power devices with higher energy storage capacities or lower energy consumption.

In many further embodiments, the process 500 may charge the group of ambient power devices based on the charging schedule (block 535). In some embodiments, the process 500 can determine a target downlink transmission power based on one or more of: the downlink path loss, the uplink power headroom, or the uplink transmission power indicated by the energy poll frames. In certain embodiments, the process 500 may generate the charging frames based on the target downlink transmission power and transmit the charging frames to the group of ambient power device based on the charging schedule corresponding to each ambient power device.

In still many embodiments, the process 500 can check if all the groups of ambient power devices are selected (block 540). In some embodiments, the process 500 can maintain, in the AP, a record of the charging frames transmitted to the group of ambient power devices. In certain embodiments, the process 500 can cross-reference the record with the list of ambient power devices in the BSS to ensure that all the groups of ambient power devices are selected, polled, and/or charged. In more embodiments, the process 500 can dynamically or periodically monitor the charge levels of the groups of ambient power devices and select the group of ambient power devices that needs to be polled and/or charged.

If at block 540, the process 500 determines that all the groups of ambient power devices are not selected, in still further embodiments, the process 500 can select the next group of ambient power devices (block 540). In some embodiments, the process 500 may implement automated monitoring and/or management techniques utilizing Machine Learning (ML) to track group selection and charging statuses of the groups of ambient power devices in real time or in near-real time. In certain embodiments, the process 500 can dynamically and/or periodically review the record of the charging frames transmitted to the group of ambient power devices to ensure that all groups of ambient power devices are selected and adequately charged.

Although a specific embodiment for the process 500 for generating the charging schedule for the ambient power devices for carrying out the various steps, processes, methods, and operations described herein is discussed with respect to FIG. 5, any of a variety of systems and/or processes may be utilized in accordance with embodiments of the disclosure. For example, the process 500 can dynamically and/or periodically modify the charging schedules of the ambient power devices. The elements depicted in FIG. 5 may also be interchangeable with other elements of FIGS. 1-4 and FIGS. 6-10 as required to realize a particularly desired embodiment.

Referring now to FIG. 6, a flowchart depicting a process 600 for charging the ambient power devices, in accordance with various embodiments of the disclosure is shown. In many embodiments, the process 600 can transmit the energy poll trigger frame indicative of the downlink transmission power (block 610). In numerous embodiments, the process 600 can be implemented by the AP. In certain embodiments, the downlink transmission power may be indicative of the transmission power with which the process 600 transmits the energy poll trigger frame to the group of ambient power devices. In more embodiments, for example, the energy poll trigger frame can include the power field indicative of downlink transmission power value or encoded downlink transmission power value. In some more embodiments, for example, the downlink transmission power can be in absolute terms or in relative terms with respect to a predetermined reference power value.

In a number of embodiments, the process 600 may receive the energy poll frame indicative of one or more energy parameters (block 620). In some embodiments, the energy poll frames can be indicative of the one or more energy parameters of the ambient power devices. In certain embodiments, the energy poll frames may also be indicative of one or more of: the downlink path loss, the uplink power headroom, or the uplink transmission power associated with the ambient power devices.

In various embodiments, the process 600 can determine the downlink path loss and uplink power headroom indicated by the energy poll frame (block 630). In some embodiments, the downlink path loss may be associated with a transmission path between the ambient power device and the AP. In certain embodiments, the downlink path loss may be indicative of reduction in signal strength of RF signals transmitted by the process 600 to the ambient power device. In more embodiments, for example, the downlink path loss can be caused by or may vary based on one or more of following factors: distance between the AP and the ambient power device, obstructions in the transmission path, multipath interference, fading, antenna gain, frequency, change in network conditions or topology, or other environmental parameters etc.

In additional embodiments, the process 600 may determine the target downlink transmission power based on the downlink path loss and the uplink power headroom (block 640). In some embodiments, the target downlink transmission power can be indicative of the power level or intensity of the charging frames or the downlink frames that the process 600 intends the ambient power device to receive. In certain embodiments, the process 600 can determine the target downlink transmission power to overcome the downlink path loss. In more embodiments, for example, the process 600 can utilize one or more signal measurement or modeling techniques to determine the target downlink transmission power. In some more embodiments, since some ambient power devices may transmit one or more uplink data frames by backscattering the RF signals received from the AP, the process 600 may also optimize downlink power allocation to effectively utilize the uplink power headroom of the ambient power device. In numerous embodiments, the process 600 can also determine the target downlink transmission power to avoid excessive power differentials between the uplink transmissions of the ambient power device and the downlink transmission received by the ambient power device. In many further embodiments, the process 600 may also determine the target downlink transmission power of the charging frames to charge the energy storage of the ambient power device. In many more embodiments, the process 600 can determine the target downlink transmission power to fully charge the energy storage and/or to charge the energy storage to the charge level required for the uplink transmission by the ambient power device.

In further embodiments, the process 600 can generate the charging schedule based on the one or more energy parameters (block 650). In some embodiments, for example, the charging schedule can be indicative of one or more of: the number of charging frames required to charge the ambient power device, transmission power or signal strengths of the charging frames, duration of the charging frames, intervals of the charging frames, etc. In certain embodiments, for example, the process 600 may generate the separate charging schedule for each ambient power device or the process 600 can generate the charging schedule for the group of ambient power devices. In more embodiments, for example, the process 600 can determine fixed charging schedule, adaptive charging schedule, priority-based charging schedule, or energy-aware charging schedule etc. based on energy requirements of the ambient power devices.

In many more embodiments, the process 600 may generate the charging frames based on the target downlink transmission power (block 660). In some embodiments, the process 600 can determine the duration and the interval of the charging frames for each ambient power device based on the charging schedule. In certain embodiments, the process 600 may also determine the number of charging frames required to fully charge the energy storages of the ambient power devices. In more embodiments, the process 600 can generate the required number of charging frames of required durations for the ambient power devices. In some more embodiments, the charging frames can have the signal strength indicated by the target downlink transmission power. In some embodiments, for example, the charging frames may be indicative of harvesting energy from the one or more ambient energy sources such that the energy storage is recharged.

In many more embodiments, the process 600 may transmit the charging frames based on the charging schedule (block 670). In some embodiments, the process 600 can transmit the charging frames when the ambient power device is in the operational state, i.e., the ambient power device is awake. In certain embodiments, the process 600 may transmit the charging frames during the TWT service period associated with the ambient power device. In more embodiments, the process 600 can transmit the charging frames based on the TBTT intervals associated with the ambient power devices. In some more embodiments, the process 600 may transmit the charging frames based on current charge level of the energy storage of the ambient power device.

Although a specific embodiment for the process 600 for charging the ambient power devices for carrying out the various steps, processes, methods, and operations described herein is discussed with respect to FIG. 6, any of a variety of systems and/or processes may be utilized in accordance with embodiments of the disclosure. For example, the process 600 can dynamically generate and transmit the charging frames to the ambient power devices to charge the energy storages of the ambient power devices. The elements depicted in FIG. 6 may also be interchangeable with other elements of FIGS. 1-5 and FIGS. 7-10 as required to realize a particularly desired embodiment.

Figure 7:
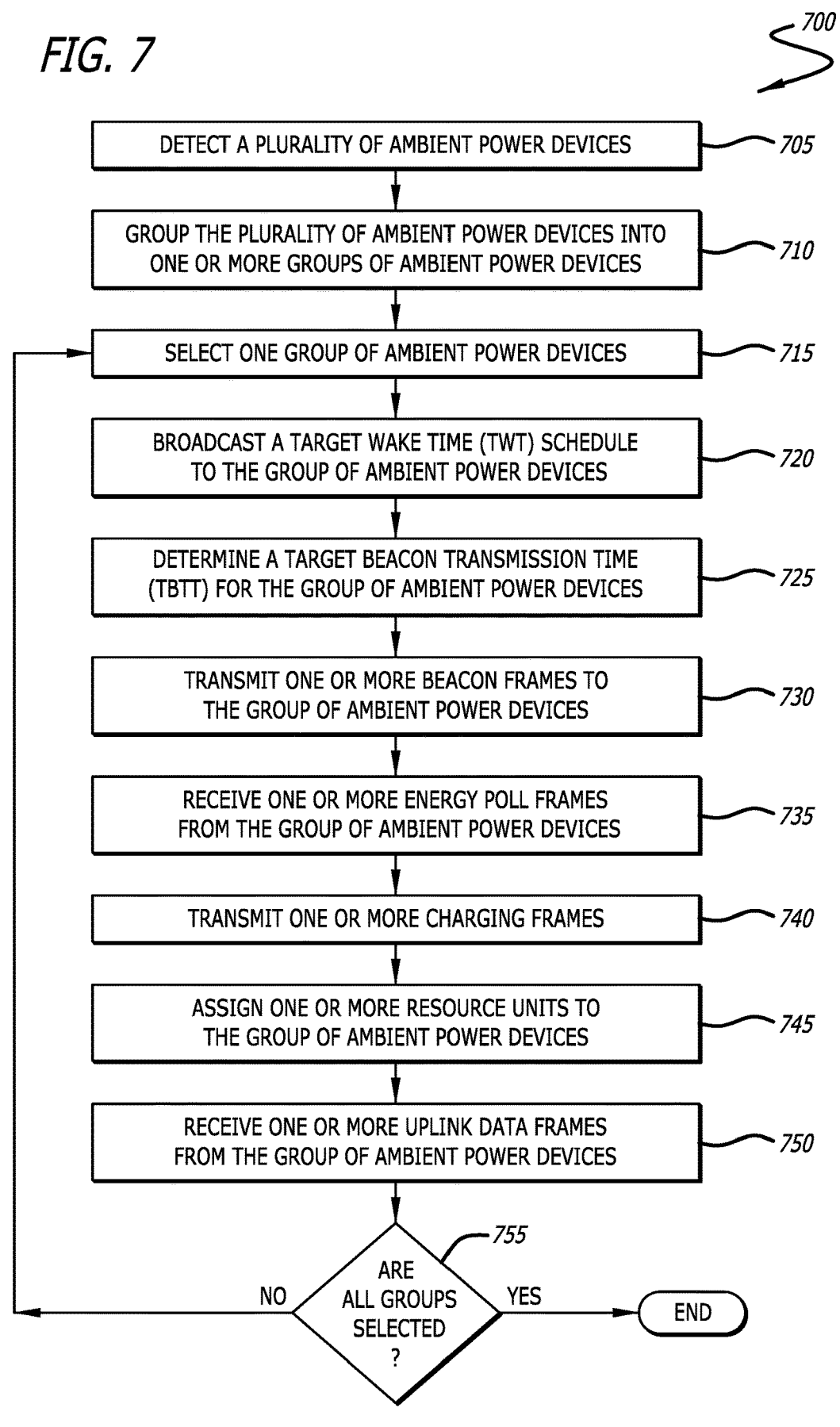
FIG. 7 is a flowchart depicting a process for charging and scheduling uplink transmissions of one or more ambient power devices, in accordance with various embodiments of the disclosure.

Referring now to FIG. 7, a flowchart depicting a process 700 for charging and scheduling uplink transmissions of the ambient power devices, in accordance with various embodiments of the disclosure is shown. In many embodiments, the process 700 can detect the plurality of ambient power devices (block 705). In some embodiments, for example, the process 700 can detect the ambient power devices by way of one or more network discovery protocols, probe requests and responses, beacon frames and responses, or signal strength measurements, etc. In certain embodiments, the process 700 can also determine whether the ambient power devices are within the BSS corresponding to the AP.

In a number of embodiments, the process 700 may group the group the plurality of ambient power devices into the one or more groups of ambient power devices (block 710). In some embodiments, the process 700 may select the one or more ambient power devices from the plurality of ambient power devices. In certain embodiments, the process 700 can select the one or more ambient power devices based on one or more of: manufacturer type, functions, serial numbers, energy requirements, signal strength measurements, distances, or locations, etc. for example. In more embodiments, the process 700 may generate and store the list of ambient power devices sorted based on one or more of: serial numbers, energy requirements, signal strength measurements, or distances etc. for example. In some more embodiments, the process 700 can select the one or more ambient power devices and group the one or more ambient power devices. In numerous embodiments, the process 700 may dynamically group the plurality of ambient power devices into one or more groups. In many more embodiments, for example, the process 700 can continuously monitor the energy storage levels of the ambient power devices and group the ambient power devices based on the energy storage levels. In many further embodiments, for example, the process 700 may group the ambient power devices based on priorities of the ambient power devices.

In various embodiments, the process 700 may select one group of ambient power devices (block 715). In some embodiments, the process 700 can sequentially select each group of ambient power devices of the one or more groups of ambient power devices such that all groups of ambient power devices receive the energy poll trigger frame. In certain embodiments, the process 700 may select the one or more groups of ambient power devices based on the one or more parameters, such as but not limited to distance of the group, energy parameters of the ambient power devices in the group, priorities of the ambient power devices in the group, etc. for example.

In additional embodiments, the process 700 can broadcast the TWT schedule to the group of ambient power devices (block 720). In some embodiments, for example, the process 700 can generate the separate TWT schedule for each ambient power device or the broadcast TWT schedule for the one or more ambient power devices or the group of ambient power devices. In certain embodiments, the process 700 can transmit the TWT schedule to the ambient power devices through one or more management frames or one or more downlink frames, or through the TWT field or element in the beacon frame. In more embodiments, the TWT schedules can be utilized to minimize contention of shared wireless medium between the plurality of ambient power devices in the BSS. In some more embodiments, the TWT schedules may also be utilized to coordinate wake-up times, uplink transmissions, reduce energy consumption of the ambient power devices or improve network performance etc. In numerous embodiments, the ambient power devices can join the TWT schedules by synchronizing the wake-up times with the wake intervals of the TWT schedule. In many more embodiments, the ambient power devices can also configure one or more operational modes or power saving modes to align with TWT service period and/or TWT service intervals. In still further embodiments, for example, the ambient power devices can join the TWT during beacon intervals, i.e., TBTT intervals without requiring negotiation.

In many additional embodiments, the process 700 can change or modify the TWT schedules based on changes in the network conditions or topology, changes in network demand, etc. for example.

In further embodiments, the process 700 may determine the TBTT interval for the group of ambient power devices (block 725). In some embodiments, the process 700 can determine the TBTT interval based on the energy parameters of the plurality of ambient power devices. In certain embodiments, the TBTT interval can be utilized to schedule the transmission of the beacon frames. In more embodiments, the beacon frames can be utilized to announce presence of the AP and/or synchronize communication with the ambient power devices. In some more embodiments, for example, for determining the TBTT interval, the process 700 can organize the plurality of ambient power devices into the groups of ambient power devices based on the energy storage capacities. In numerous embodiments, for example, the ambient power devices with low energy requirements or low energy storage capacities can be grouped separately from the ambient power devices with higher energy requirements or higher energy storage capacities. Thereafter, in some more embodiments, the process 700 may determine TBTT interval for each group of ambient power devices. In many more embodiments, for example, similar to the charging schedules, the TBTT intervals may be fixed intervals, priority-based intervals, or energy-aware intervals etc. In still more embodiments, for example, the ambient power devices with lower energy requirements may have longer TBTT intervals (for e.g., 10 beacon intervals), while the ambient power devices with higher energy requirements may have shorter intervals (for e.g., 5 beacon intervals).

In many more embodiments, the process 700 can transmit the beacon frames to the group of ambient power devices (block 730). In some embodiments, after determining the TBTT intervals, the process 700 may set the TBTT interval field or element in the beacon frame accordingly. In certain embodiments, the process 700 can transmit the beacon frames to the groups of ambient power devices based on the TBTT intervals. In more embodiments, the beacon frames may also include information such as but not limited to network identifiers, capabilities, supported data rates, and timing information etc. for the ambient power devices. In numerous embodiments, the beacon frames can include the energy poll trigger frames. In many more embodiments, the beacon frames may be indicative of polling the ambient power devices to receive information about the energy parameters of the ambient power devices.

In many additional embodiments, the process 700 may receive the energy poll frames from the group of ambient power devices (block 735). In some embodiments, the energy poll frames may also be indicative of one or more of: the one or more energy parameters, the downlink path loss, the uplink power headroom, or the uplink transmission power etc. associated with corresponding ambient power devices. In certain embodiments, the process 700 can determine which ambient power devices are active, i.e., in the operational mode based on the energy poll frames.

In many further embodiments, the process 700 can transmit the charging frames (block 740). In some embodiments, process 700 can determine the target downlink transmission power based on one or more of: the downlink path loss, the uplink power headroom, or the uplink transmission power indicated by the energy poll frames. In certain embodiments, the process 700 may generate the charging frames based on the target downlink transmission power and transmit the charging frames to the group of ambient power device based on the charging schedule corresponding to each ambient power device. In numerous embodiments, the process 700 can transmit the charging frames when the ambient power device is in the operational state, i.e., the ambient power device is awake. In many further embodiments, the process 700 may transmit the charging frames during the TWT service period associated with the ambient power device. In still many embodiments, the process 700 can transmit the charging frames based on the TBTT intervals associated with the ambient power devices. In many additional embodiments, the process 700 may transmit the charging frames based on the current charge level of the energy storage of the ambient power device.

In still many embodiments, the process 700 may assign the one or more resource units to the group of ambient power devices (block 745). In some embodiments, for example, the resource units or the radio resources may be indicative of one or more carrier frequencies, one or more time slots, transmission order, multiplexing and/or modulating techniques, or TXOPs etc. assigned to the ambient power devices. In certain embodiments, the process 700 can also assign one or more multiplexing or encoding techniques to the ambient power devices.

In still further embodiments, the process 700 can receive the uplink data frames from the group of ambient power devices (block 750). In some embodiments, the group of ambient power devices may receive the trigger frame and/or the beacon frame and transmit the uplink data by way of the uplink frames to the AP, in response to the trigger frame and/or the beacon frame. In certain embodiments, some ambient power devices can be sensors, such as but not limited to temperature, pressure, humidity, or health sensors etc. for example. In more embodiments, such sensors can measure one or more physical parameters such as but not limited to temperature, pressure, or humidity values etc. for example. In that case, in some more embodiments, the uplink data can be indicative of the one or more physical parameters measured by the ambient power device. In numerous embodiments, the uplink frames can be modulated by the ambient power device and/or may be transmitted by backscattering the RF signals received from the AP.

In numerous embodiments, the process 700 can check if all the groups of ambient power devices are selected (block 755). In some embodiments, the process 700 can maintain, in the AP, the record of the charging frames transmitted to the group of ambient power devices. In certain embodiments, the process 700 can cross-reference the record with the list of ambient power devices in the BSS to ensure that all the groups of ambient power devices are selected, polled, and/or charged. In more embodiments, the process 700 can dynamically or periodically monitor the charge levels of the groups of ambient power devices and select the group of ambient power devices that needs to be polled and/or charged.

If at block 755, the process 700 determines that all the groups of ambient power devices are not selected, in still further embodiments, the process 700 can select the next group of ambient power devices (block 715). In some embodiments, the process 700 may implement automated monitoring and/or management techniques utilizing ML to track group selection and charging statuses of the groups of ambient power devices in real time or in near-real time. In certain embodiments, the process 700 can dynamically and/or periodically review the record of the charging frames transmitted to the group of ambient power devices to ensure that all groups of ambient power devices are selected and adequately charged.

Although a specific embodiment for the process 700 for charging and scheduling uplink transmissions of the ambient power devices for carrying out the various steps, processes, methods, and operations described herein is discussed with respect to FIG. 7, any of a variety of systems and/or processes may be utilized in accordance with embodiments of the disclosure. For example, the process 700 can dynamically schedule the uplink transmissions of the ambient power devices. The elements depicted in FIG. 7 may also be interchangeable with other elements of FIGS. 1-6 and FIGS. 8-10 as required to realize a particularly desired embodiment.

Figure 8:
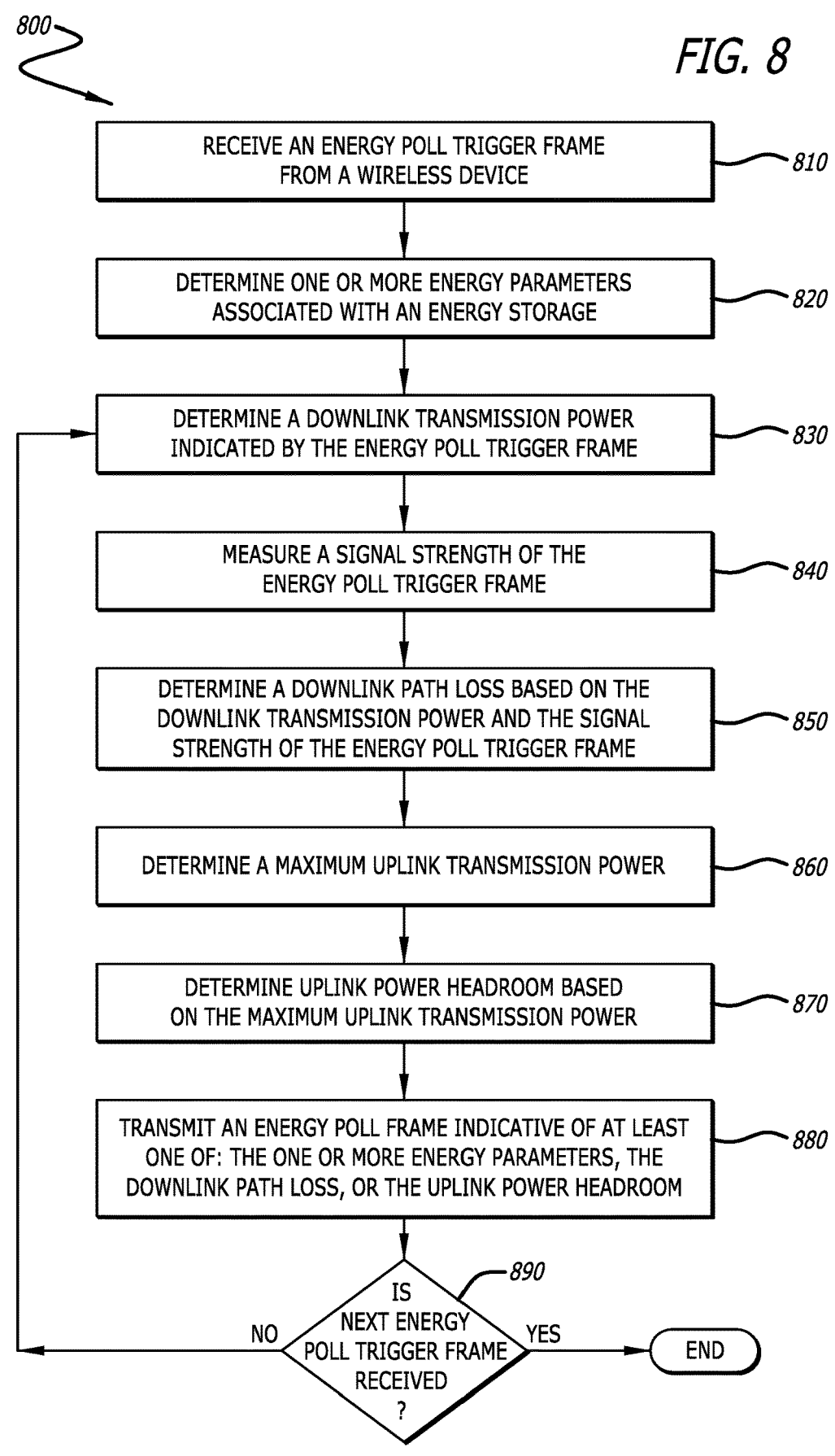
FIG. 8 is a flowchart depicting a process for generating one or more energy poll frames, in accordance with various embodiments of the disclosure.

Referring now to FIG. 8, a flowchart depicting a process 800 for generating the energy poll frames, in accordance with various embodiments of the disclosure is shown. In many embodiments, the process 800 can receive the energy poll trigger frame from the wireless device such as the AP (block 810). In some embodiments, the process 800 may be implemented by the ambient power device. In certain embodiments, the energy poll trigger frame can be indicative of the downlink transmission power. In more embodiments, the downlink transmission power may be indicative of the transmission power with which the AP transmits the energy poll trigger frame to the group of ambient power devices. In some more embodiments, the energy poll trigger frame can include the power field indicative of the downlink transmission power or encoded downlink transmission power. In numerous embodiments, for example, the downlink transmission power can be in absolute terms or in relative terms with respect to the predetermined reference power value.

In a number of embodiments, the process 800 may determine the energy parameters associated with the energy storage (block 820). In some embodiments, the examples of the energy parameters of the ambient power device include but are not limited to the maximum energy storage capacity of the ambient power device or the uplink transmission power of the ambient power device. In certain embodiments, the maximum energy storage capacity can be indicative of maximum charge level that the battery or the capacitor in the ambient power device may hold. In more embodiments, the uplink transmission power can indicate the amount of charge level required for transmitting the uplink frames or the amount of charge consumed in transmitting the one or more uplink frames. In some more embodiments, for example, the uplink transmission may vary dependent on communication protocols, transmission distances, and power management settings etc. associated with the ambient power device.

In various embodiments, the process 800 can determine the downlink transmission power indicated by the energy poll trigger frame (block 830). In some embodiments, the process 800 may decode the energy poll trigger frame to extract the power field indicative of the downlink transmission power or the encoded downlink transmission power. In certain embodiments, the energy poll trigger frame can be a management frame or a downlink frame received by the process 800.

In additional embodiments, the process 800 may measure the signal strength of the energy poll trigger frame (block 840). In some embodiments, the process 800 can measure the RSSI value corresponding to the energy poll trigger frame. In certain embodiments, the process 800 may normalize the RSSI value to account for variations in receiver sensitivity, antenna characteristics, or environmental conditions etc. In more embodiments, the ambient power device can include one or more signal reception and processing circuits to measure the RF signal and generate the RSSI value indicative of the signal strength of the RF signal.

In further embodiments, the process 800 can determine the downlink path loss based on the downlink transmission power and the signal strength of the energy poll trigger frame (block 850). In some embodiments, the process 800 may compare the RSSI value with the downlink transmission power. In certain embodiments, the downlink path loss can be determined based on a difference between the downlink transmission power and the RSSI value. In more embodiments, the downlink path loss may be indicative of reduction in signal strength of RF signals transmitted by the AP to the ambient power device. In some more embodiments, for example, the downlink path loss can be caused by or may vary based on one or more of following factors: distance between the AP and the ambient power device, obstructions in the transmission path, multipath interference, fading, antenna gain, frequency, changes in network conditions or topology, or other environmental parameters etc.

In many more embodiments, the process 800 may determine the maximum uplink transmission power (block 860). In some embodiments, for example, the process 800 can determine the maximum uplink transmission power based on one or more of: the maximum energy storage capacity of the battery or the capacitor. In certain embodiments, for example, the maximum uplink transmission power may vary based on the operational modes of the ambient power device, for example, low power mode, sleep mode, or hibernation mode etc.

In many additional embodiments, the process 800 can determine the uplink power headroom based on the maximum uplink transmission power (block 870). In some embodiments, the process 800 may determine the uplink power headroom based on a difference between the maximum uplink transmission power of the ambient power device and a current uplink transmission power of the ambient power device. In certain embodiments, the uplink power headroom can be indicative of the maximum transmission power that the process 800 can support without exceeding regulatory limits or causing interference.

In many further embodiments, the process 800 may transmit the energy poll frames indicative of at least one of: the one or more energy parameters, the downlink path loss, or the uplink power headroom (block 880). In some embodiments, the process 800 can transmit the energy poll frame by utilizing one or more radio resources, such as but not limited to the one or more carrier frequencies, time slots, or TXOPs assigned to the ambient power device. In certain embodiments, the process 800 may transmit the energy poll frames in the TWT service period assigned to the ambient power device.

In still many embodiments, the process 800 can check if next energy poll trigger frame is received (block 890). In some embodiments, the process 800 may continuously or periodically monitor the RF channels to detect the energy poll trigger frames. In certain embodiments, the process 800 may periodically wake up from low-power states to check for the energy poll trigger frames and return to the sleep mode if no activity is detected. If at block 890, the process 800 determines that the next energy frame is received, in still further embodiments, the process 800 may determine the downlink transmission power indicated by the next energy poll trigger frame (block 830).

Although a specific embodiment for the process 800 for generating the energy poll frames for carrying out the various steps, processes, methods, and operations described herein is discussed with respect to FIG. 8, any of a variety of systems and/or processes may be utilized in accordance with embodiments of the disclosure. For example, the process 800 can ensure timely participation in energy polling cycles and effective reporting of energy requirements and energy parameters. The elements depicted in FIG. 8 may also be interchangeable with other elements of FIGS. 1-7 and FIGS. 9-10 as required to realize a particularly desired embodiment.

Referring now to FIG. 9, a flowchart depicting a process 900 for operating the ambient power device in the TWT schedule, in accordance with various embodiments of the disclosure is shown. In many embodiments, the process 900 can receive the beacon frame from the AP (block 910). In some embodiments, the process 900 may be implemented by the ambient power device. In certain embodiments, the beacon frame can be received at the TBTT intervals. In certain embodiments, the beacon frames may also include information such as but not limited to network identifiers, capabilities, supported data rates, and timing information etc. for the ambient power devices.

In a number of embodiments, the process 900 may check if the beacon frame is indicative of the TWT schedule (block 920). In some embodiments, the TWT schedule can be indicated in the management frames or the downlink frames through the TWT field or element in the beacon frame. In certain embodiments, the TWT schedules can be utilized to minimize contention of shared wireless medium between the plurality of ambient power devices in the BSS. In more embodiments, the TWT schedules may also be utilized to coordinate wake-up times, uplink transmissions, reduce energy consumption of the ambient power devices or improve network performance etc. In some more embodiments, the ambient power devices can join the TWT schedules by synchronizing the wake-up times with wake intervals of the TWT schedule. In numerous embodiments, the ambient power devices can also configure one or more operational modes or power saving modes to align with TWT service period and/or TWT service intervals.

If at block 920, the process 900 determines that the beacon frame is indicative of the TWT schedule, in various embodiments, the process 900 can determine the current state of operation based on the TWT schedule (block 930). In some embodiments, the current state of operation can be the operational mode during the TWT service period. In certain embodiments, the current state of operation can be the sleep mode or low power mode during the TWT interval.

After block 930 and/or if at block 920, the process 900 determines that the beacon frame is not indicative of the TWT schedule, in various embodiments, the process 900 can determine the energy parameters (block 940). In some embodiments, the examples of the one or more energy parameters of the ambient power device include but are not limited to a maximum energy storage capacity of the ambient power device or an uplink transmission power of the ambient power device. In certain embodiments, the process 900 may also determine the downlink path loss, the uplink power headroom, or the uplink transmission power.

In additional embodiments, the process 900 can generate the energy poll frames indicative of at least one of: the current state of operation and the one or more energy parameters (block 950). In some embodiments, the process 900 may generate the energy poll frames in response to the energy poll trigger frame. In certain embodiments, the energy poll frames can be utilized by the AP to generate the charging schedule.

In further embodiments, the process 900 may transmit the energy poll frame to the AP (block 960). In some embodiments, the process 900 can transmit the energy poll frame by utilizing one or more radio resources, such as but not limited to the one or more carrier frequencies, time slots, or TXOPs assigned to the ambient power device. In certain embodiments, the process 900 may transmit the energy poll frames in the TWT service period assigned to the ambient power device.

Although a specific embodiment for the process 900 for operating the ambient power device in the TWT schedule for carrying out the various steps, processes, methods, and operations described herein is discussed with respect to FIG. 9, any of a variety of systems and/or processes may be utilized in accordance with embodiments of the disclosure. For example, the process 900 can utilize the TWT schedule to reduce contention, minimize power save duration, and optimize resource allocation within the wireless communication network. The elements depicted in FIG. 9 may also be interchangeable with other elements of FIGS. 1-8 and FIG. 10 as required to realize a particularly desired embodiment.

Figure 10:
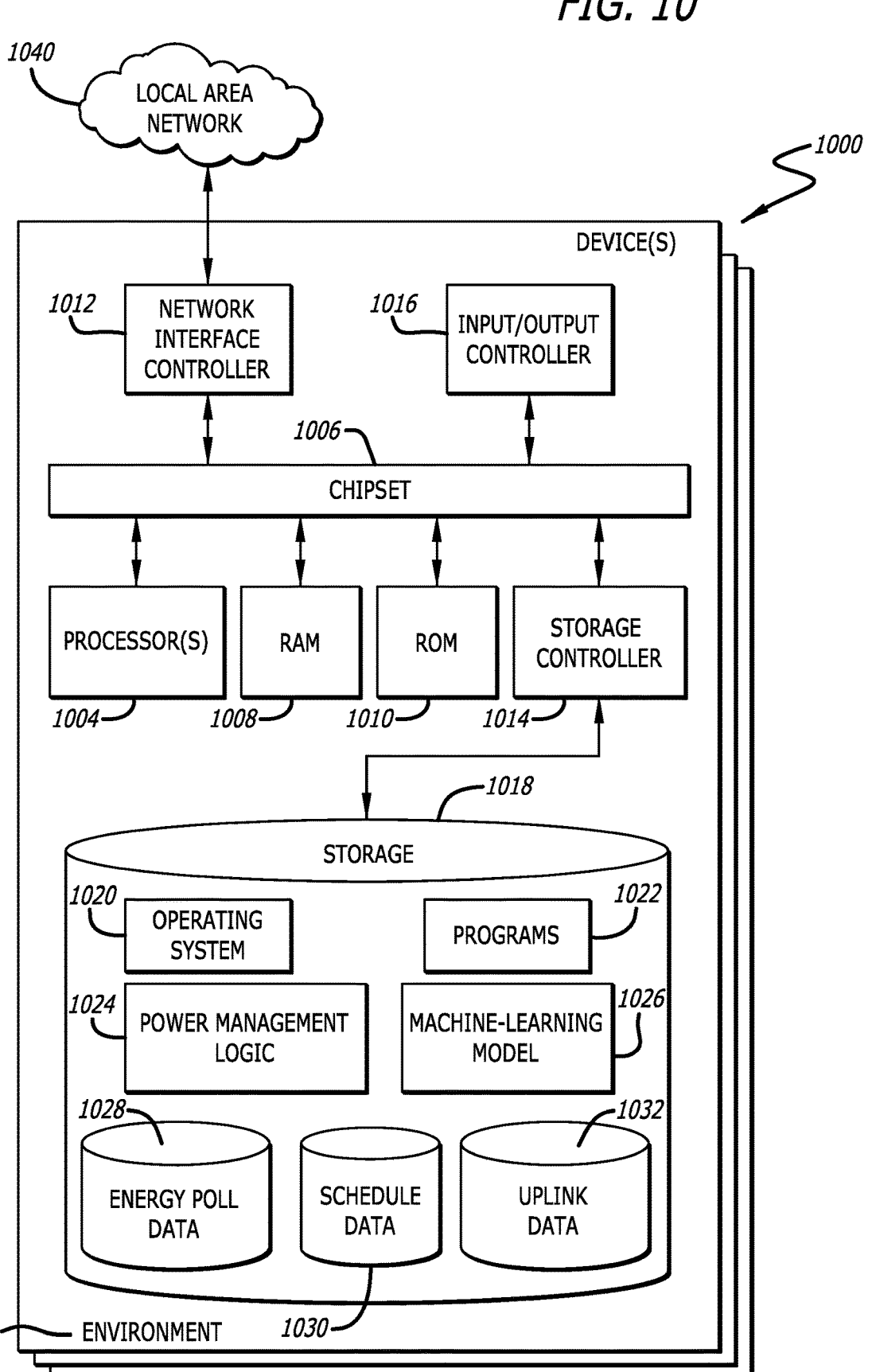
FIG. 10 is a conceptual block diagram of a device suitable for configuration with a power management logic, in accordance with various embodiments of the disclosure.

Referring to FIG. 10, a conceptual block diagram of a device 1000 suitable for configuration with a power management logic, in accordance with various embodiments of the disclosure is shown. The embodiment of the conceptual block diagram depicted in FIG. 10 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 10 can also illustrate an access point, a switch, or a router in accordance with various embodiments of the disclosure. The device 1000 may, in many non-limiting examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In a number of embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Additional embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for instance, store an operating system 1020, applications 1022, energy data 1028, schedule data 1030, and uplink data 1032 which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The energy data 1028 can store the energy parameters of the ambient power devices. The energy data 1028 can also store the energy poll trigger frames and/or the energy poll frames. The schedule data 1030 can store the charging schedules and/or the TWT schedules associated with the ambient power devices. The schedule data 1030 may also store TBTT interval. The schedule data 1030 can also store radio resource assignment data indicative of the radio resources allocated to the ambient power devices. The uplink data 1032 may store the uplink data received from the ambient power devices. The uplink data 1032 can store the uplink frames and/or decoded uplink frames.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

In many more embodiments, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In many additional embodiments, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In certain embodiments, the device 1000 can also include computer-readable storage media having instructions stored thereupon for performing any of the other computer-implemented operations described herein.

In many further embodiments, the device 1000 may include a power management logic 1024. The power management logic 1024 can be configured to perform one or more of the various steps, processes, operations, and/or other methods that are described above. Often, the power management logic 1024 can be a set of instructions stored within a non-volatile memory that, when executed by the processor(s)/controller(s) 1004 can carry out these steps, etc. In some embodiments, the power management logic 1024 may be a client application that resides on a network-connected device, such as, but not limited to, a server, switch, personal or mobile computing device in a single or distributed arrangement. The power management logic 1024 can poll the ambient power devices, receive the energy parameters of the ambient power devices, and generate the charging schedules for the ambient power devices.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10 and can include other components that are not explicitly shown in FIG. 10 or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

Finally, in numerous additional embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026.

The ML model(s) 1026 can be configured to generate inferences to make predictions or draw conclusions from data. An inference can be considered the output of a process of applying a model to new data. This can occur by learning from at least the energy data 1028, the schedule data 1030, and the uplink data 1032 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1026 may be generated by human/administrator verifications or may compare predicted outcomes with actual outcomes.

Although a specific embodiment for the device 1000 suitable for configuration with the power management logic for carrying out the various steps, processes, methods, and operations described herein is discussed with respect to FIG.

10, any of a variety of systems and/or processes may be utilized in accordance with embodiments of the disclosure. For example, the device 1000 may be in a virtual environment such as a cloud-based network administration suite, or it may be distributed across a variety of network devices or switches. The elements depicted in FIG. 10 may also be interchangeable with other elements of FIGS. 1-9 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
a memory communicatively coupled to the processor; and
a power management logic, configured to:
    detect a plurality of ambient power devices;
    select one or more ambient power devices of the plurality of ambient power devices;
    broadcast an energy poll trigger frame to the one or more ambient power devices; and
    receive one or more energy poll frames indicative of one or more energy parameters corresponding to the one or more ambient power devices in response to the energy poll trigger frame.

2. The device of claim 1, wherein the energy poll trigger frame is further indicative of a downlink transmission power corresponding to the energy poll trigger frame.

3. The device of claim 2, wherein the one or more energy poll frames are indicative of a downlink path loss corresponding to the energy poll trigger frame observed by the one or more ambient power devices.

4. The device of claim 3, wherein the one or more energy poll frames are further indicative of an uplink power headroom associated with the one or more ambient power devices.

5. The device of claim 4, wherein the power management logic is further configured to determine a target downlink transmission power based on the downlink path loss and the uplink power headroom.

6. The device of claim 5, wherein the power management logic is further configured to generate a charging schedule for the one or more ambient power devices based on the one or more energy parameters.

7. The device of claim 6, wherein the power management logic is further configured to:
    generate one or more charging frames based on the target downlink transmission power; and
    transmit the one or more charging frames to the one or more ambient power devices based on the charging schedule.

8. The device of claim 7, wherein the charging schedule is indicative of one or more of:
    one or more charging durations of the one or more charging frames;
    one or more charging intervals of the one or more charging frames; or
    a number of the one or more charging frames associated with the one or more ambient power devices.

9. The device of claim 8, wherein the one or more energy parameters comprise one or more of:
    one or more maximum energy storage capacities of the one or more ambient power devices; or
    one or more uplink transmission powers associated with the one or more ambient power devices.

10. The device of claim 9, wherein the power management logic is further configured to:
    group the plurality of ambient power devices into one or more groups of ambient power devices based on the one or more energy parameters;
    determine one or more time intervals for transmitting one or more beacon frames to the one or more groups of ambient power devices; and
    transmit the one or more beacon frames to the one or more groups of ambient power devices at the one or more time intervals.

11. The device of claim 10, wherein the one or more beacon frames are indicative of one or more broadcast Target Wake Time (TWT) schedules associated with the one or more groups of ambient power devices.

12. The device of claim 11, wherein the one or more energy poll frames are indicative of one or more current states of operation of the one or more ambient power devices based on the one or more broadcast TWT schedules.

13. The device of claim 12, wherein the power management logic is further configured to assign one or more radio resources to the one or more ambient power devices based on the one or more energy poll frames.

14. A device, comprising:
a processor;
a memory communicatively coupled to the processor; and
a power management logic, configured to:

receive an energy poll trigger frame from a wireless device;

determine one or more energy parameters associated with an energy storage;

generate an energy poll frame indicative of the one or more energy parameters; and transmit the energy poll frame to the wireless device in response to the energy poll trigger frame.

15. The device of claim 14, wherein the power management logic is further configured to:

determine a downlink transmission power indicated by the energy poll trigger frame;

measure a signal strength of the energy poll trigger frame; and determine a downlink path loss based on the downlink transmission power and the signal strength of the energy poll trigger frame.

16. The device of claim 15, wherein the power management logic is further configured to:

determine a maximum uplink transmission power; and determine an uplink power headroom based on the maximum uplink transmission power.

17. The device of claim 16, wherein the power management logic is further configured to:

receive a beacon frame from the wireless device;

determine a Target Wake Time (TWT) schedule indicated by the beacon frame; and determine a current state of operation based on the TWT schedule.

18. The device of claim 17, wherein the energy poll frame is further indicative of at least one of: the downlink path loss, the uplink power headroom, or the current state of operation.

19. A method, comprising:

detecting a plurality of ambient power devices;

selecting one or more ambient power devices of the plurality of ambient power devices;

broadcasting an energy poll trigger frame to the one or more ambient power devices; and receiving one or more energy poll frames indicative of one or more energy parameters corresponding to the one or more ambient power devices in response to the energy poll trigger frame.

20. The method of claim 19, further comprising:

generate a charging schedule for the one or more ambient power devices based on the one or more energy parameters; and transmit one or more charging frames to the one or more ambient power devices based on the charging schedule.

* * * * *